United States Patent
Shimizu

(10) Patent No.: US 7,936,467 B2
(45) Date of Patent: May 3, 2011

(54) DATA PROCESSING METHOD SUITABLE FOR SYSTEM INCLUDING IMAGE PROCESSING APPARATUS, SYSTEM INCLUDING IMAGE PROCESSING APPARATUS, IMAGE PROCESSING APPARATUS, DATA ERASING METHOD, PROGRAM FOR IMPLEMENTING THE METHOD, AND STORAGE MEDIUM STORING THE PROGRAM

(75) Inventor: Yukihiko Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 10/422,842

(22) Filed: Apr. 25, 2003

(65) Prior Publication Data

US 2004/0012812 A1    Jan. 22, 2004

(30) Foreign Application Priority Data

Apr. 26, 2002 (JP) .................................. 2002-126105
Apr. 16, 2003 (JP) .................................. 2003-111707

(51) Int. Cl.
*G06F 3/12* (2006.01)

(52) U.S. Cl. ..................... 358/1.15; 358/1.14; 358/1.16; 358/1.9; 358/1.13; 711/100; 711/163; 711/164; 713/193

(58) Field of Classification Search ................. 358/1.14, 358/1.15, 1.16, 1.9, 1.13; 711/100, 163, 711/164; 713/193
See application file for complete search history.

(56) References Cited

U.S. PATENT DOCUMENTS

| | | | |
|---|---|---|---|
| 6,285,459 B1 * | 9/2001 | Koakutsu et al. | 358/1.15 |
| 6,559,967 B1 | 5/2003 | Akiba et al. | |
| 7,031,003 B2 * | 4/2006 | Nagai et al. | 358/1.13 |
| 7,126,707 B2 * | 10/2006 | Takeo et al. | 358/1.15 |
| 7,224,477 B2 * | 5/2007 | Gassho et al. | 358/1.14 |
| 7,302,698 B1 * | 11/2007 | Proudler et al. | 726/2 |
| 7,349,118 B2 * | 3/2008 | Zipprich et al. | 358/1.16 |
| 2002/0032703 A1 | 3/2002 | Gassho et al. | |
| 2002/0036790 A1 * | 3/2002 | Nishiyama | 358/1.14 |

FOREIGN PATENT DOCUMENTS

| | | |
|---|---|---|
| EP | 0998118 | 5/2000 |
| EP | 1 134 649 A2 | 9/2001 |
| JP | 7-170480 | 7/1995 |
| JP | 11-143658 | 5/1999 |
| JP | 2000-198257 | 7/2000 |
| JP | 2000-201248 | 7/2000 |

* cited by examiner

*Primary Examiner* — David K Moore
*Assistant Examiner* — Benjamin O Dulaney
(74) *Attorney, Agent, or Firm* — Fitzpatrick, Cella, Harper & Scinto

(57) ABSTRACT

There is provided an image processing apparatus which is capable of maintaining high data security and provide high convenience and high security. When a print request is transmitted from a client PC to a printer in a security print mode, a main CPU of the printer determines whether or not print data received from the client PC is for printing in the security print mode. If the print data received from the client PC is determined to be for printing in the security print mode, the main CPU causes all of the print data and temporary data to be erased from the hard disk.

8 Claims, 17 Drawing Sheets

| | |
|---|---|
| NORMAL COPY MODE | NORMAL (NO ERASURE) |
| APPLIED COPY MODE | SECURITY LEVEL 1 (ERASING METHOD 1) |
| NORMAL TRANSMISSION MODE | SECURITY LEVEL 1 (ERASING METHOD 1) |
| CONFIDENTIAL TRANSMISSION MODE | SECURITY LEVEL 2 (ERASING METHOD 2) |
| NORMAL RECEPTION AND PRINT MODE | SECURITY LEVEL 1 (ERASING METHOD 1) |
| CONFIDENTIAL RECEPTION AND PRINT MODE | SECURITY LEVEL 4 (ERASING METHOD 4) |
| NO-PASSWORD BOX MODE | SECURITY LEVEL 3 (ERASING METHOD 3) |
| PASSWORD-PROTECTED BOX MODE | SECURITY LEVEL 5 (ERASING METHOD 5) |

FIG. 3

FAT USED IN PRINTING PROCESS S203
AND DATA BLOCKS ON HARD DISK

| | | |
|---|---|---|
| NORMAL PRINT MODE | 011 | 010111 . . . 111001 . . . 1101 |
| SECURITY PRINT MODE 1 | 000 | 010111 . . . 111001 . . . 1101 |
| SECURITY PRINT MODE 2 | 000 | XXXX11 . . . 111001 . . . 1101 |
| SECURITY PRINT MODE 3 | 000 | XXXX11 . . . 1XXX01 . . . 1101 |
| SECURITY PRINT MODE 4 | 000 | 000000 . . . 000000 . . . 0000 |
| SECURITY PRINT MODE 5 | 000 | XXXXXX . . . XXXXXX . . . XXXX |

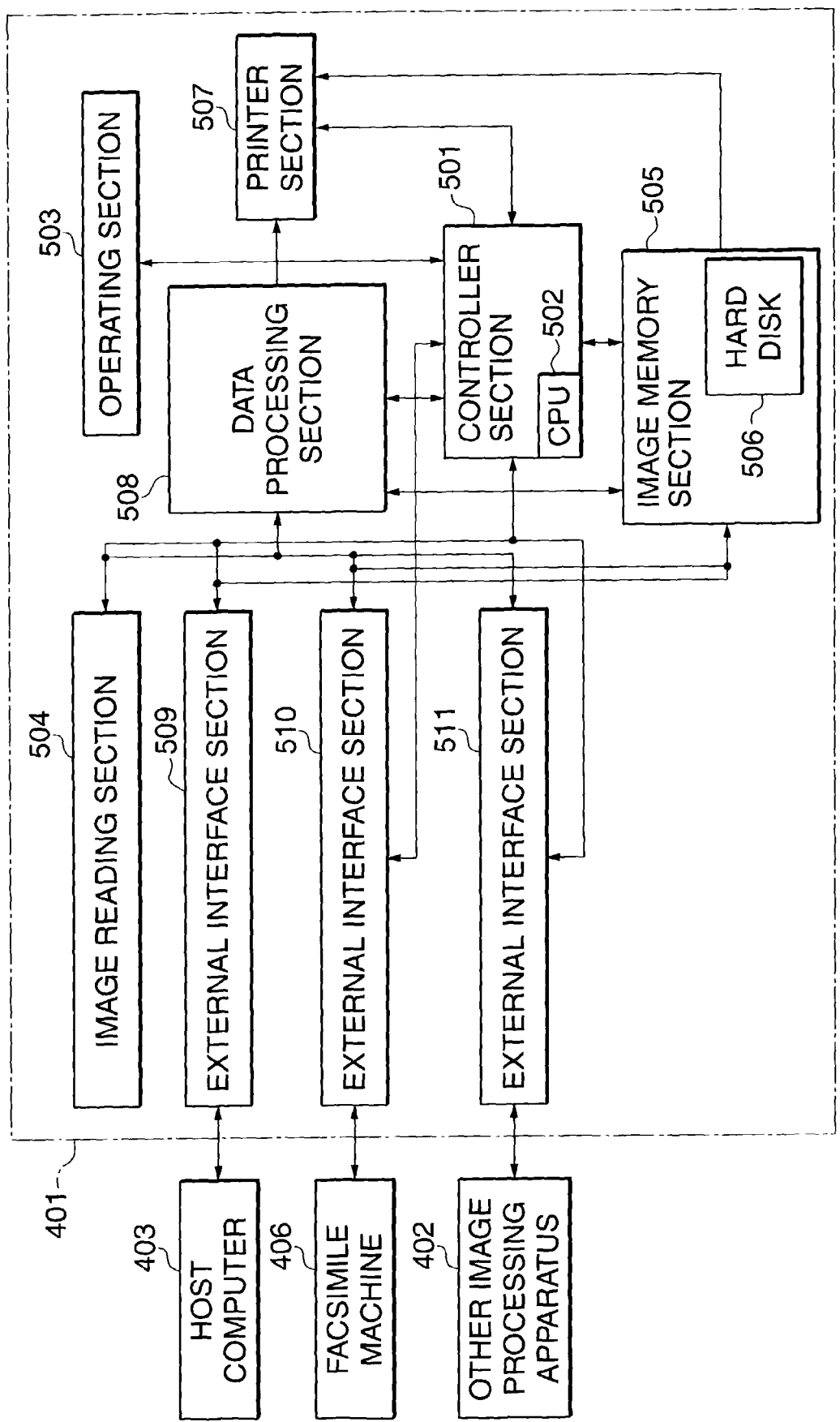

BASIC SCREEN

COPY FUNCTION SCREEN

TRANSMISSION FUNCTION SCREEN

BOX FUNCTION SCREEN

FIG. 12

| NORMAL COPY MODE | NORMAL (NO ERASURE) |
|---|---|
| APPLIED COPY MODE | SECURITY LEVEL 1 (ERASING METHOD 1) |
| NORMAL TRANSMISSION MODE | SECURITY LEVEL 1 (ERASING METHOD 1) |
| CONFIDENTIAL TRANSMISSION MODE | SECURITY LEVEL 2 (ERASING METHOD 2) |
| NORMAL RECEPTION AND PRINT MODE | SECURITY LEVEL 1 (ERASING METHOD 1) |
| CONFIDENTIAL RECEPTION AND PRINT MODE | SECURITY LEVEL 4 (ERASING METHOD 4) |
| NO-PASSWORD BOX MODE | SECURITY LEVEL 3 (ERASING METHOD 3) |
| PASSWORD-PROTECTED BOX MODE | SECURITY LEVEL 5 (ERASING METHOD 5) |

FIG. 13

| JOB FILE 1 | PRINT DATA OF JOB 1 | ATTRIBUTE INFORMATION OF JOB 1 (NORMAL TRANSMISSION MODE) | SECURITY LEVEL 1 (ERASING METHOD 1) |
|---|---|---|---|
| JOB FILE 2 | PRINT DATA OF JOB 2 | ATTRIBUTE INFORMATION OF JOB 2 (NORMAL COPY MODE) | NORMAL (NO ERASURE) |
| JOB FILE 3 | PRINT DATA OF JOB 3 | ATTRIBUTE INFORMATION OF JOB 3 (CONFIDENTIAL TRANSMISSION MODE) | SECURITY LEVEL 2 (ERASING METHOD 2) |
| JOB FILE 4 | PRINT DATA OF JOB 4 | ATTRIBUTE INFORMATION OF JOB 4 (APPLIED COPY MODE) | SECURITY LEVEL 1 (ERASING METHOD 1) |
| .... | .... | .... | .... |
| JOB FILE N-3 | PRINT DATA OF JOB N-3 | ATTRIBUTE INFORMATION OF JOB N-3 (NORMAL RECEPTION AND PRINT MODE) | SECURITY LEVEL 1 (ERASING METHOD 1) |
| JOB FILE N-2 | PRINT DATA OF JOB N-2 | ATTRIBUTE INFORMATION OF JOB N-2 (CONFIDENTIAL RECEPTION AND PRINT MODE) | SECURITY LEVEL 4 (ERASING METHOD 4) |
| JOB FILE N-1 | PRINT DATA OF JOB N-1 | ATTRIBUTE INFORMATION OF JOB N-1 (NO-PASSWORD BOX MODE) | SECURITY LEVEL 3 (ERASING METHOD 3) |
| JOB FILE N | PRINT DATA OF JOB N | ATTRIBUTE INFORMATION OF JOB N (PASSWORD-PROTECED BOX MODE) | SECURITY LEVEL 5 (ERASING METHOD 5) |

HARD DISK

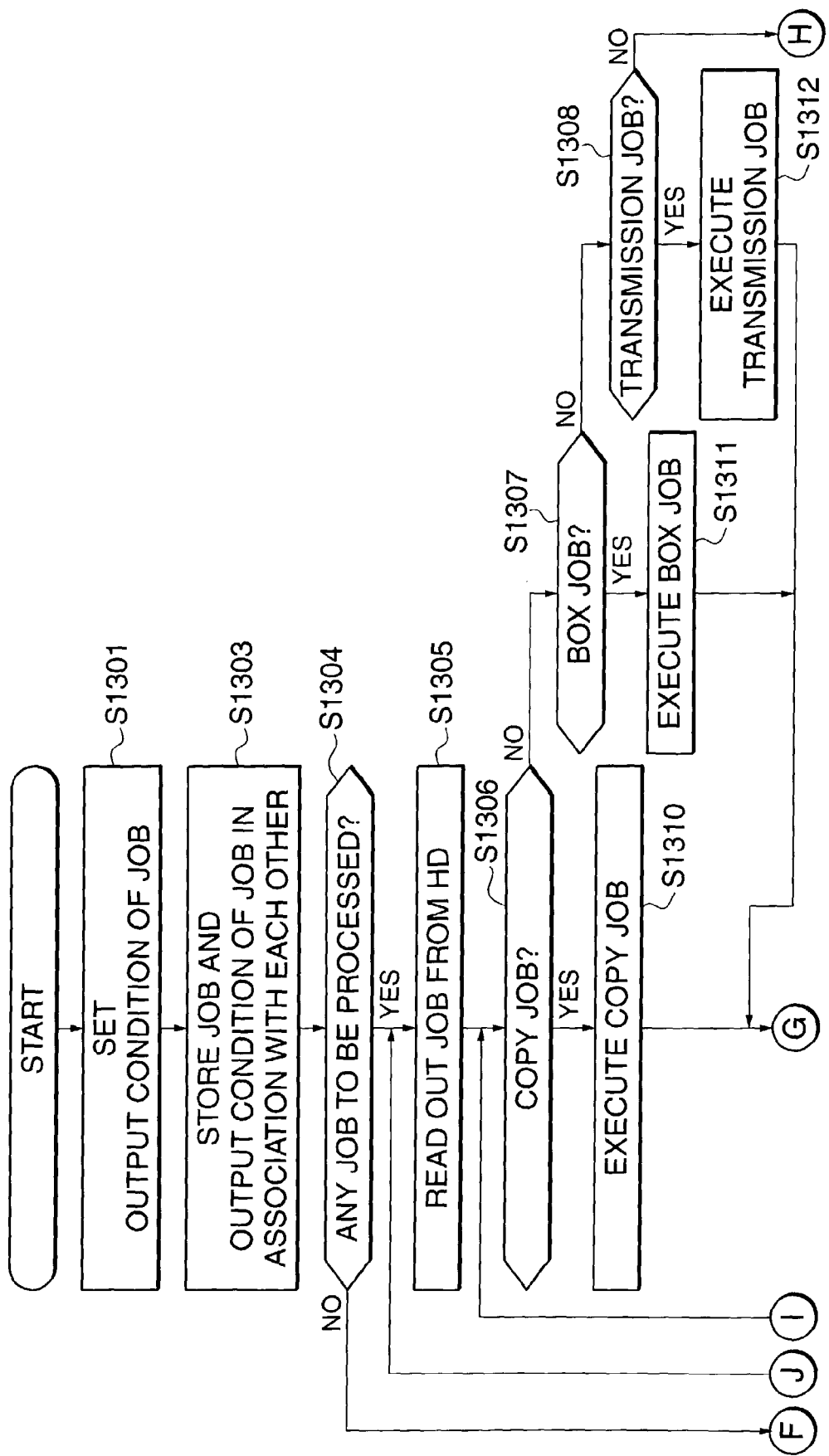

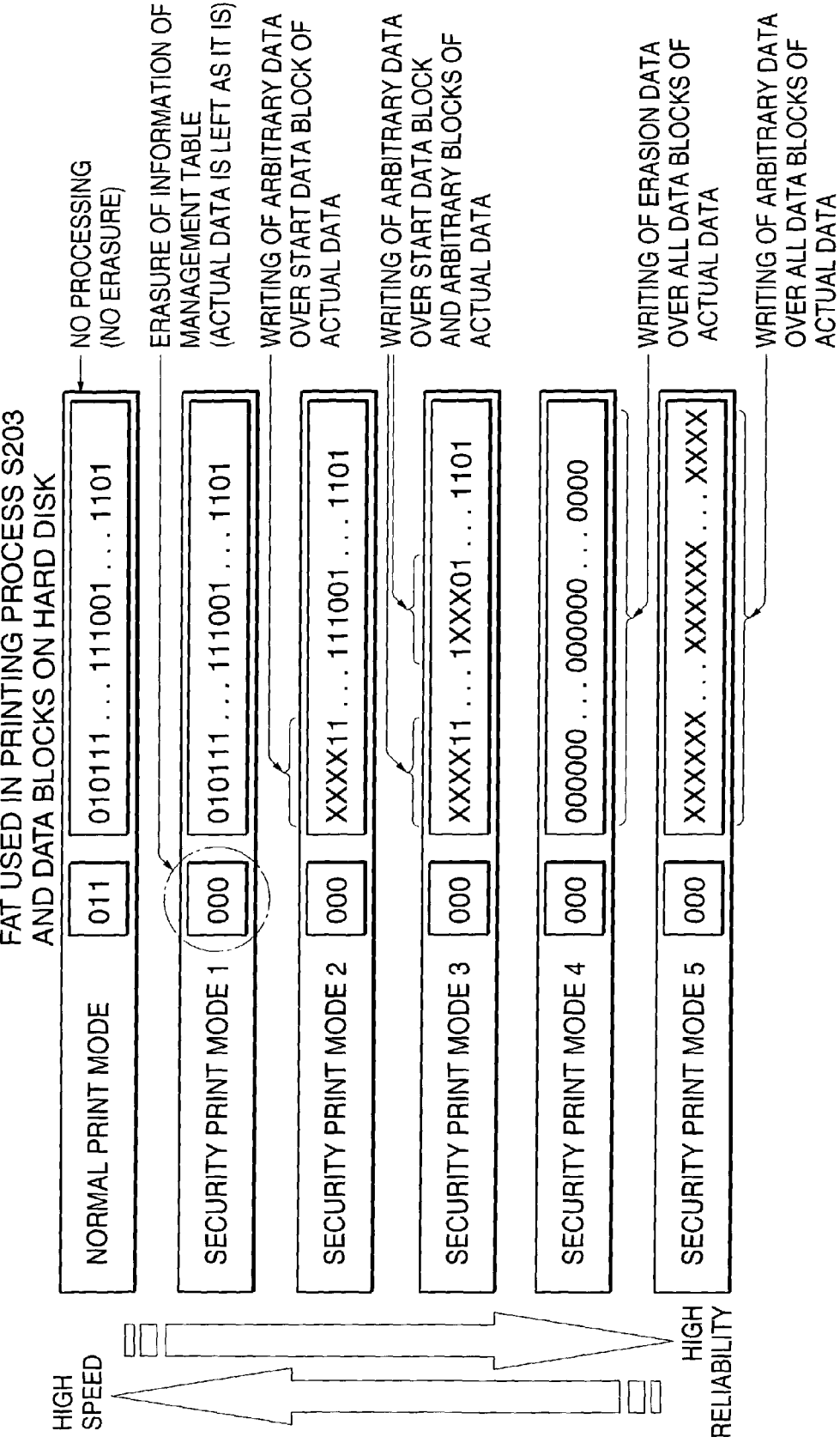

DATA PROCESSING METHOD SUITABLE FOR SYSTEM INCLUDING IMAGE PROCESSING APPARATUS, SYSTEM INCLUDING IMAGE PROCESSING APPARATUS, IMAGE PROCESSING APPARATUS, DATA ERASING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a data processing method suitable for a system including an image processing apparatus, a system including an image processing apparatus, an image processing apparatus, and a data erasing method for the apparatus, which are suitable for maintaining data security by erasing data stored especially in a nonvolatile storage medium after execution of a printing process by an image forming apparatus, such as a printer, in which the stored data is output to a printer engine to form an image on paper, and a program for implementing the method, and a storage medium storing the program.

2. Description of the Related Art

Conventionally, for a system comprised of an image processing apparatus (image-outputting apparatus), such as a printer, which provides a printing service, and a personal computer connected to the image processing apparatus, as a client (client PC) making use of the printing service, there has been proposed a method of once storing image data output from the client PC, and causing the image data to be printed out at a time point a predetermined operation is carried out by the image processing apparatus.

However, the above image processing apparatuses of the prior art suffer from the following problem: In the printing process executed by the image processing apparatus, internal description language data temporarily generated as intermediate processing data peculiar to the apparatus during execution of the printing process, compressed data, and image data to be printed out are stored in a storage medium, especially a nonvolatile storage medium, and these data remain unerased in the storage medium even after the power of the apparatus is turned off. Therefor, there has been a demand for a technique of maintaining data security of the image processing apparatus (first problem).

Further, if all data remaining in the storage medium are controlled to be simply erased only for preserving data security, in the event that data of a plurality of users remain stored in the storage medium, there can be a problem of data being erased in spite of intention of users who do not wish to have their data erased. This results in degraded usability. Further, if the control is provided such that all data existing in the storage medium are erased, the erasure takes much time when there are a plurality data remaining in the storage medium. Further, in the case of erasing data at all, the conventional control method cannot meet various needs of users, such as the demand of high-speed in the data erasure, the demand of high data security, and so forth (second problem).

SUMMARY OF THE INVENTION

It is a first object of the invention to provide a data processing method suitable for a system including an image processing apparatus, a system including an image processing apparatus, an image processing apparatus, and a data erasing method therefor, which are capable of maintaining high data security and provide high convenience and high security, a program for implementing the method, and a storage medium storing the program.

It is a second object of the invention to provide a data processing method suitable for a system including an image processing apparatus, a system including an image processing apparatus, an image processing apparatus, and a data erasing method therefor, which are capable of meeting various needs of users for data erasure and realizing compatibility between the high data erasing speed and the high data security, and a program for implementing the method, and a storage medium storing the program.

To attain the above object, in a first aspect of the present invention, there is provided a data processing method suitable for a system including an image processing apparatus capable of processing a plurality of jobs that can be printed, the image processing apparatus including storage means for storing the jobs, the data processing method comprising a setting step of enabling any one of a plurality of erasing modes of respective kinds in which an erasing process can be carried out on a job stored in the storage means to be selectively set to each job stored in the storage means, on a job-by-job basis, and a control step of enabling the erasing process to be carried out on the job stored in the storage means by the one of the plurality of erasing modes which is set to the job.

With the data processing method, the problems of the prior art can be solved. When data of jobs of a plurality of users remain stored in the storage medium, it is possible to prevent occurrence of the problem of erasing data in spite of intention of users who do not wish to have their data erased, thereby improving usability. Further, it is possible to solve the problem of taking much time in data erasure when a plurality data remain in the storage medium, which can be caused by the control of erasing all data existing in the storage medium. Further, it is possible to provide data erasing methods flexibly meeting various needs of users, such as the demand of high-speed in the data erasure, the demand of high data security, and so forth, thereby realizing compatibility between the high data erasing speed and the high data security and reliability, in a manner meeting the needs of users.

Preferably, the plurality of erasing modes of respective kinds include at least two of a first erasing mode in which the erasing process is carried out on a job stored in the storage means by erasing management information for reading the job from the storage means, a second erasing mode in which the erasing process is carried out on a job stored in the storage means by writing arbitrary data over data of a start data block of the job, a third erasing mode in which the erasing process is carried out on a job stored in the storage means by writing arbitrary data over data of the start data block and arbitrary data blocks of the job, a fourth erasing mode in which the erasing process is carried out on a job stored in the storage means by writing predetermined data over all data of the job, and a fifth erasing mode in which the erasing process is carried out on a job stored in the storage means by writing arbitrary data over all data of the job, and the setting step enables any one of the plurality of erasing modes to be selectively set to each of a plurality of jobs stored in the storage means, on a job-by-job basis.

More preferably, the plurality of erasing modes of respective kinds include at least two of a first erasing mode in which the erasing process is carried out on a job stored in the storage means by erasing management information for reading the job from the storage means, a second erasing mode in which the erasing process is carried out on a job stored in the storage means by writing arbitrary data over data of a start data block of the job, a third erasing mode in which the erasing process is carried out on a job stored in the storage means by writing arbitrary data over data of the start data block and arbitrary data blocks of the job, a fourth erasing mode in which the erasing process is carried out on a job stored in the storage means by writing predetermined data over all data of the job, and a fifth erasing mode in which the erasing process is carried out on a job stored in the storage means by writing arbitrary data over all data of the job, and the control step includes causing the erasing process to be carried out by erasing the management information for reading the job from the storage means, when the erasing process is carried out on the job having the first erasing mode set thereto in the setting step, causing the erasing process to be carried out by writing the arbitrary data over the data of the start data block of the job stored in the storage means, when the erasing process is carried out on the job having the second erasing mode set thereto in the setting step, causing the erasing process to be carried out by writing the arbitrary data over the data of the start data block and the arbitrary data blocks of the job stored in the storage means, when the erasing process is carried out on the job having the third erasing mode set thereto in the setting step, causing the erasing process to be carried out by writing the predetermined data over all data of the job stored in the storage means, when the erasing process is carried out on the job having the fourth erasing mode set thereto in the setting step, and causing the erasing process to be carried out by writing the arbitrary data over all data of the job stored in the storage means when the erasing process is carried out on the job set to the fifth erasing mode in the setting step.

Preferably, the erasing process carried out on the job is a process for inhibiting reading of the job stored in the storage means.

Preferably, the erasing process carried out on the job is a process for changing a first state in which the job stored in the storage means can be read therefrom and a second state in which the job stored in the storage means cannot be read therefrom.

Preferably, the setting step enables execution of at least one of a process for enabling any one of the plurality of erasing modes be set to each job on a job-by-job basis by setting any one of a plurality of security levels associated with the plurality of erasing modes, respectively, to be set to each job on a job-by-job basis, and a process for enabling any one of the plurality of erasing modes be set to each job on a job-by-job basis by setting any one of a plurality of erasing methods associated with the plurality of erasing modes, respectively, to be set to each job on a job-by-job basis.

More preferably, the setting step enables execution of at least one of a manual setting process in which an erasing mode is set to a job based on a setting by a user, and an automatic setting process in which an erasing mode is automatically set to a job based on attribute information of the job.

Further preferably, when the erasing mode is set to the job based on the setting by the user, an operation screen is displayed for enabling the user to set any one of the plurality of erasing modes to the job.

Preferably, the setting step enables execution of at least one of a process for enabling setting of an erasing mode to the job to be executed by associating the erasing mode with the job before the job is stored in the storage means, and a process for enabling setting of an erasing mode to the job to be executed by associating the erasing mode with the job after the job is stored in the storage means.

Preferably, prior to execution of the erasing process, execution of display of a guidance is enabled for confirmation of the erasing mode set to the job, by a user.

Preferably, prior to execution of the erasing process on the job, execution of at least one of a setting operation for allowing a user to cancel the erasing process on the job, and a setting operation for allowing a user to change a setting of the erasing mode set to the job is enabled.

Preferably, prior to execution of the erasing process on the job, a setup screen is displayed, the setup screen including a guidance display portion for confirmation of the erasing mode set to the job, by the user, and an operation display portion for enabling the user to change a setting of the erasing mode set to the job.

Preferably, the image processing apparatus is capable of processing at least one of a plurality of kinds of jobs including a job in a copy mode, a job in a transmission mode, a job in a box mode, and a job in a print mode, and the setting step enables one of the erasing modes to be set to each of the plurality of kinds of jobs in a discriminating fashion on a kind of job-by-kind of job basis.

Preferably, the control step enables execution of at least one of the erasing process on a job stored in the storage means of the image processing apparatus, and the erasing process on a job stored in storage means of an external apparatus that can communicate with the image processing apparatus.

Preferably, the setting step enables any one of a plurality of kinds of erasing modes to be selectively set to each job on a job-by-job basis, and at the same time enables a setting for inhibiting the erasing process to be set to each job on a job-by-job basis.

Preferably, the image processing apparatus is capable of processing at least jobs in a box mode in which jobs can be stored in a plurality of box areas virtually allocated in the storage means and can be subjected to a printing process, on a box area-by-box area basis, and the setting step enables any one of the plurality of erasing modes to be selectively set to each box area of the plurality of box areas, on a box area-by-box area basis.

Preferably, the image processing apparatus is capable of operating in a print mode in which a job from an external apparatus is processed, and the setting step enables an erasing mode to be set to the job in the print mode via an operation screen of the external apparatus, the control step causing the erasing process to be carried out on the job in the print mode according to the erasing mode set by the external apparatus.

Preferably, the image processing apparatus is capable of operating in a print mode in which a job from an external apparatus is processed, and the setting step enables an erasing mode to be set to the job in the print mode, based on an output condition of the job in the print mode set via a printer driver of the external apparatus, the control step causing the erasing process to be carried out on the job in the print mode according to the erasing mode set based on the output condition of the job.

To attain the above object, in a second aspect of the present invention, there is provided a system including an image processing apparatus capable of processing a plurality of jobs that can be printed, the image processing apparatus including storage means for storing the jobs, the system having a plurality of data erasing modes of respective kinds in which an erasing process can be carried out on a job stored in the storage means, the system comprising a setting unit for enabling any one of the plurality of erasing modes of respective kinds to be selectively set to each job stored in the storage means, on a job-by-job basis, and a control unit for enabling the erasing process to be carried out on the job stored in the storage means by the one of the plurality of erasing modes which is set to the job.

With the system according to the second aspect of the invention, data involved in image processing and stored in the non-volatile storage device are erased according to a set one of a plurality of data erasing modes associated with data erasure levels. Therefore, a system which is convenient and high in data security can be provided.

To attain the above object, in a third aspect of the present invention, there is provided a computer-readable storage medium storing a program for causing a computer to execute a method for a system including an image processing apparatus capable of processing a plurality of jobs that can be printed, the image processing apparatus including storage means for storing the jobs, the method comprising a setting step of enabling any one of a plurality of erasing modes of respective kinds in which an erasing process can be carried out on a job stored in the storage means to be selectively set to each job stored in the storage means, on a job-by-job basis, and a control step of enabling the erasing process to be carried out on the job stored in the storage means by the one of the plurality of erasing modes which is set to the job.

To attain the above object, in a fourth aspect of the present invention, there is provided an image processing apparatus an image processing apparatus comprising a storage device that stores data for use in image processing, a determining device that determines whether the data stored in the storage device is security data erasure of which is designated, and an erasing device that erases the data stored in the storage device when the determining device determines that the data stored in the storage device is the security data.

Preferably, the determining device carries out the determination based on information indicative of a security mode transmitted from an external apparatus communicatable with the image processing apparatus.

Preferably, the determining device carries out the determination based on a command transmitted from an external apparatus communicatable with the image processing apparatus.

Preferably, the determining device carries out the determination based on information contained in print data transmitted from an external apparatus communicatable with the image processing.

More preferably, the information contained in the print data comprises a flag indicative of whether or not the data stored in the storage device should be erased.

Preferably, the image processing apparatus according further comprises a setting device that selectively sets one of a plurality of security modes provided in association with respective levels of erasure of the data stored in the storage device, and wherein the determining device carries out the determination based on the security mode set by the setting device.

More preferably, the setting device includes a selecting device that selects one of the plurality of security modes according to a security level of the data stored in the storage device.

Preferably, the storage device comprises a nonvolatile storage device.

More preferably, the plurality of security modes comprise a security mode in which a table indicating entities of the data stored in the storage device is erased, a security mode in which arbitrary data having an arbitrary size is written over data blocks, starting with a start data block, of the data stored in the storage device, a security mode in which arbitrary data having an arbitrary size is written over an arbitrary part of the data blocks, including the start data block, of the data stored in the storage device, a security mode in which all of the data blocks of the data stored in the storage device is erased, and a security mode in which arbitrary data is written over all of the data blocks of the data stored in the storage device.

Preferably, the erasing device comprises a storage function-invalidating device that invalidates a function of the storage device.

More preferably, the image processing apparatus further comprises an instruction device that instructs erasure of a specific part or all of the data stored in the storage device in a desired one of a plurality of security modes.

Preferably, the image processing apparatus is an apparatus selected from the group consisting of a printer, a copying machine, a multifunction machine, and a facsimile machine.

Preferably, the data for use in the image processing comprises data transmitted from an external apparatus, and intermediate processing data and data for forming an image on a recording medium, which are generated by the image processing apparatus.

To attain the above object, in a fifth aspect of the present invention, there is provided an image processing apparatus comprising an image reading device that reads an image from an original, an image forming device that forms an image on a recording medium, a storage device that stores data for use in image processing, a selecting device that selects one of a plurality of erasure settings indicative of respective levels of erasure of the data stored in the storage device, a determining device that determines the selected erasure setting, and an erasing device that erases the data stored in the storage device based on the selected erasure setting determined by the determining device.

Preferably, the storage device comprises a nonvolatile storage device.

Preferably, the plurality of erasure settings comprise an erasure setting for erasing a table indicating entities of the data stored in the storage device, an erasure setting for writing arbitrary data over a start data block of data blocks of the data stored in the storage device, an erasure setting for writing arbitrary data over an arbitrary part of the data blocks, including the start data block of the data blocks of the data stored in the storage device, an erasure setting for writing erasure data over all of the data blocks of the data stored in the storage device, and an erasure setting for writing arbitrary data over all of the data blocks of the data stored in the storage device.

Preferably, the selecting device manually selects one of the plurality of erasure settings.

Preferably, the plurality of erasure settings are provided in association with respective jobs to be processed by the image processing apparatus.

More preferably, the jobs processed by the image processing apparatus comprise a copy job for forming an image read from an original on an recording medium, a transmission job for transmitting data to an external device and a box job for storing data of an image read from an original in the storage device.

Preferably, the plurality of erasure settings are provided in association with respective in which the image processing apparatus operates.

More preferably, the modes in which the image processing apparatus operates comprise a copy mode in which an image read from an original is formed on an recording medium, a transmission mode in which data is transmitted to an external device, a reception mode in which data is received from an external device, and a box mode in which data of an image read from an original is stored in the storage device.

Preferably, the data for use in the image processing comprise data for use in any of the copy job, the transmission job, and the box job.

To attain the above object, in a sixth aspect of the present invention, there is provided a data erasing method for an image processing apparatus including a storage device that stores data for use in image processing, comprising a determining step of determining whether the data stored in the storage device is security data erasure of which is designated, and an erasing step of erasing the data stored in the storage device when it is determined in the determining step that the data stored in the storage device is the security data.

To attain the above object, in a seventh aspect of the present invention, there is provided a data erasing method for an image processing apparatus including an image reading device that reads an image from an original, an image forming device that forms an image on a recording medium, and a storage device that stores data for use in image processing, comprising selecting step of selecting one of a plurality of erasure settings indicative of respective levels of erasure of the data stored in the storage device, a determining step of determining the selected erasure setting, and an erasure step of erasing the data stored in the storage device based on the selected erasure setting determined in the determining step.

To attain the above object, in an eighth aspect of the present invention, there is provided a program for causing a computer to execute the data erasing method according to the sixth aspect of the present invention.

To attain the above object, in a ninth aspect of the present invention, there is provided a program for causing a computer to execute the data erasing method according to the seventh aspect of the present invention.

To attain the above object, in a tenth aspect of the present invention, there is provided a computer-readable storage medium storing the program according to the eighth aspect of the present invention.

To attain the above object, in an eleventh aspect of the present invention, there is provided a computer-readable storage medium storing the program according to the ninth aspect of the present invention.

The above and other objects, features, and advantages of the invention will become more apparent from the following detailed description taken in conjunction with the accompanying drawings.

BRIEF DESCRIPTION OF THE DRAWINGS

FIG. 3 is a diagram useful in explaining how data stored on a hard disk are erased in a normal print mode and a plurality of security print modes by an image processing apparatus according to a second embodiment of the present invention;

FIG. 5 is a block diagram showing the arrangement of the image processing apparatus according to the fifth embodiment;

FIGS. 6A to 6D are diagrams schematically showing screens displayed on an operating section of the image processing apparatus, in which FIG. 6A shows a basic screen, FIG. 6B a copy function screen, FIG. 6C a transmission function screen, and FIG. 6D a box function screen;

FIG. 12 is a diagram showing a table in which security levels or erasing methods are set in a manner associated with attribute information of jobs to be carried out by the image processing apparatus;

FIG. 13 is a diagram showing in a tabulated form job files which are stored on a hard disk of the image processing apparatus in association with security levels or erasing methods set based on attribute information of the jobs;

FIG. 14 is a flowchart showing an erasing process executed by the image processing apparatus based on a security level or erasing method automatically set to a job;

FIG. 16 is a diagram useful for explaining how data are erased.

DETAILED DESCRIPTION OF THE PREFERRED EMBODIMENTS

The present invention will now be described in detail with reference to the drawings showing preferred embodiments thereof.

Figure 1:
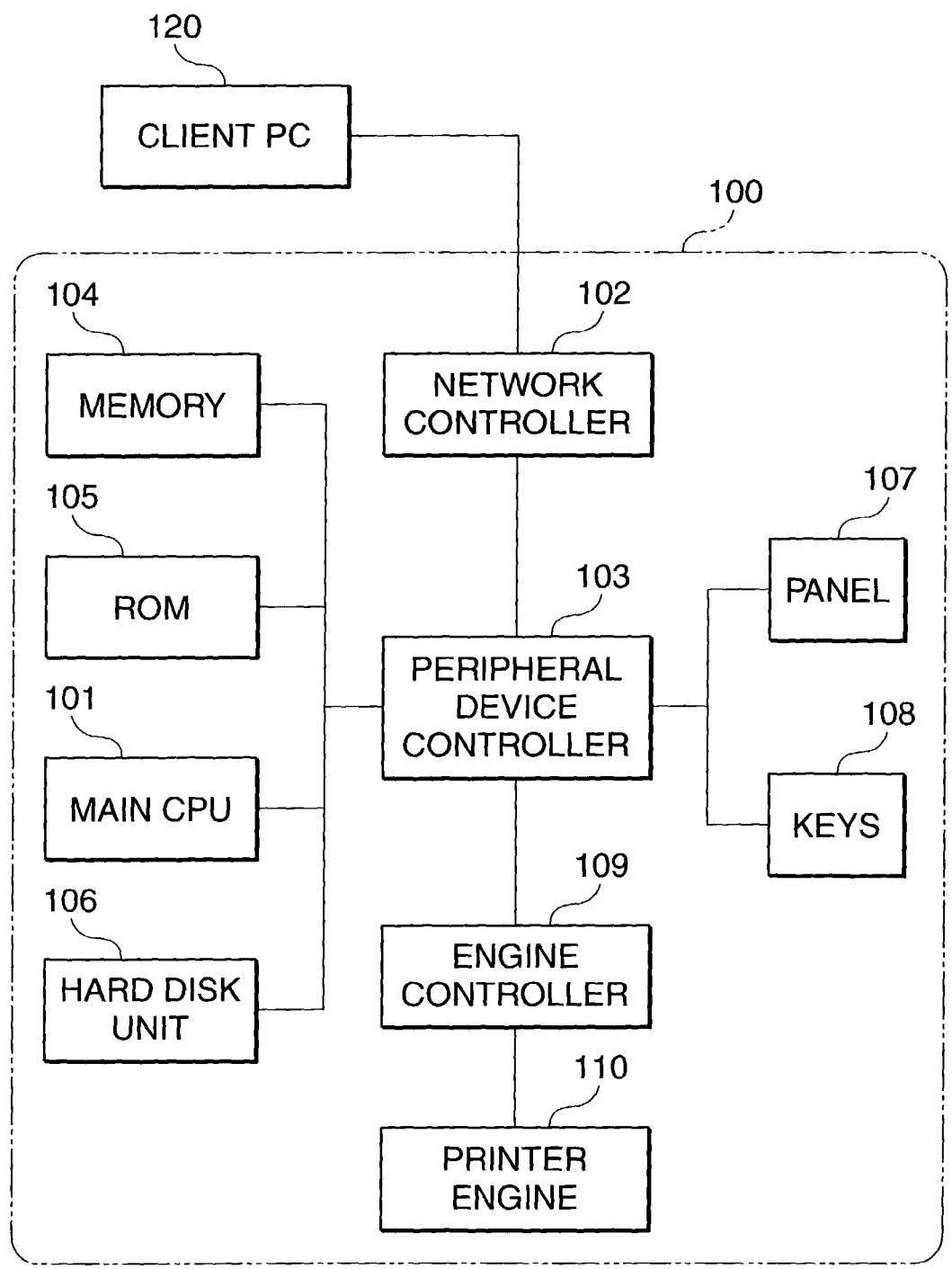
FIG. 1 is a block diagram showing the arrangement of an image processing apparatus according to a first embodiment of the present invention.

FIG. 1 is a block diagram showing the arrangement of an image processing apparatus according to a first embodiment of the present invention. In the present embodiment, a printing apparatus (printer), such as a digital multifunction machine, will be described as an example of the image processing apparatus.

As shown in FIG. 1, the image processing apparatus is configured e.g. as a printer 100 which is comprised of a main CPU 101, a network controller 102, a peripheral device controller 103, a memory 104, a ROM 105, a hard disk unit 106, a panel 107, keys 108, an engine controller 109, and a printer engine 110. In FIG. 1, reference numeral 120 designates a client PC.

The client PC 120 is implemented by a personal computer and is connected to the printer 100 via the network controller 102 of the printer 100, and transmits a print request and print data to the printer 100.

The printer 100 performs printing operation based on the print request and print data transmitted from the client PC to form an image on paper as an output medium. The main CPU 101 serves as a central control unit for executing control of the whole printer, and carries out processes (a printing process and a data erasing process which is executed in a security print mode), described hereinafter with reference to a flowchart shown in FIG. 2, according to programs stored in the ROM 105.

The network controller 102 is a transmission and reception control unit connected to the client PC 120, for receiving the print request and print data transmitted from the client PC 120 to the printer 100, and transmitting information concerning the status of the printer, such as error information of jamming of paper, to the client PC 120. The peripheral device controller 103 is a unit for controlling the memory 104, the ROM 105, and the hard disk unit 106, as peripheral devices connected to the main CPU 101, and the panel 107 and the printer engine 110 connected to the peripheral device controller 103.

The memory 104 is a volatile storage device for temporarily storing the print data, etc. The ROM 105 is a read only memory used for storing control programs (including a print program, referred to hereinafter) for carrying out overall control of the printer 100, including control of the start of the printer 100. The hard disk unit 106 contains a hard disk, not shown, which is a nonvolatile storage device for temporarily storing print data, etc., which is implemented by a magnetic medium, and is used for storing data e.g. when the amount of data stored in the memory 104 exceeds a predetermined capacity. The hard disk stores print data transmitted from the client PC 120, temporary data, intermediate processing data, final output data delivered to the printer engine 110 to be printed out, etc.

The panel 107 is a display device for displaying the status of the printer 100 e.g. during printing operation thereof. The keys 108 form an input device via which the user directly inputs instructions to the printer 100 e.g. for setting the number of copies to be printed or starting printing operation). The engine controller 109 controls driving of the printer engine 110, transfer of data output from the peripheral device controller 103 to the printer engine 110, and so forth. The printer engine 110 performs printout operations, i.e. printing an image on paper, under the control of the engine controller 109.

In the present embodiment, print data to be processed or having processed is stored as a file in the memory 104 or on the hard disk of the hard disk unit 106, and a security level of the file is determined based on an erasing instruction. The file is erased according to the determined security level to thereby maintain data security of the file. The erasing instruction is given in the form of setting of a security print mode (in which not only the printing process but also the data erasing process is carried out). The erasing instruction may be given in other forms, including a command issued from the client PC, and setting of one of a plurality of security print modes available in the printer 100.

Next, a detailed description will be given of the operations of the printer 100 constructed as above which are performed for reception of a print request and print data sent from the client PC 120, printing out, and data erasure, with reference to FIG. 2.

Figure 2:
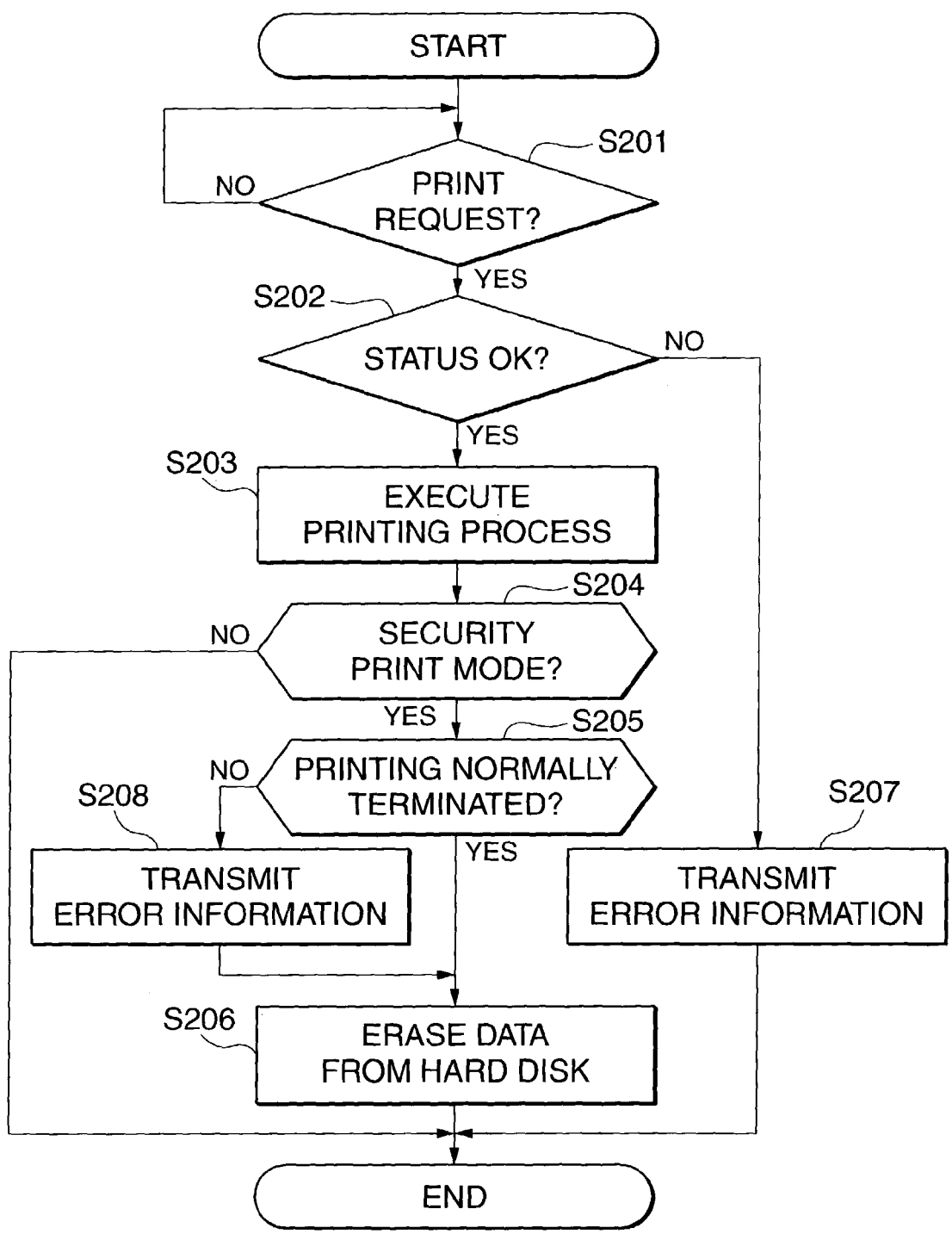
FIG. 2 is a flowchart showing a printing process and a data erasing process in a security print mode, which are carried out by the image processing apparatus.

FIG. 2 is a flowchart showing the printing process and the data erasing process in the security print mode carried out by the printer 100. The main CPU 101 of the printer 100 executes processes illustrated in the flowchart according to programs including the print program, stored in the ROM 105.

As shown in FIG. 2, first, in a step S201, the main CPU 101 of the printer 100 determines whether or not a print request (request for printout to the printer 100) has been received from the client PC 120. If the client PC 120 transmits the print request requesting printing in the security print mode, the printer 100 terminates a print request wait state in which a print request is awaited via the network controller 102, and the main CPU 101 receives the print request via the network controller 102, to store information of the client PC 120, information of a print mode, and information of the print request, in the memory 104, followed by the process proceeding to the following step S202.

In the step S202, the main CPU 101 checks the internal status of the printer 100 to determine whether or not there is error information, e.g. information indicative of the printer having run short of paper, in the engine controller 109. If it is determined in the step S202 that the printer 100 suffers from a problem of the internal status thereof e.g. if error information exists in the engine controller 109, the program proceeds to a step S207, wherein the main CPU 101 transmits the error information to the client PC 120 via the network controller 102, and erases the information of the client PC 120, the information of the print mode, and the information of the print request, from the memory 104, followed by terminating the present process.

If it is determined in the step S202 that there is no problem in the internal status of the printer 100 (there is no error information in the engine controller 109), in a step S203, the main CPU 101 causes the engine controller 109 to drive the printer engine 110 to carry out the printing process for forming an image on paper. In the printing process, print data and temporary data transmitted from the client PC 120 to the printer 100 are stored in the memory 104 via the network controller 102. When the amount of data stored in the memory 104 exceeds a predetermined capacity, the main CPU 101 transfers the contents in the memory 104 to the hard disk unit 106 for protection of the same.

After the printer 100 has received all the print data from the client PC 120, the main CPU 101 thereof starts the print program stored in the ROM 105 to convert the print data received from the client PC 120 into image data for printout by the printer engine 110. Intermediate processing data and other data generated in the course of the conversion are sequentially written into the memory 104. Further, when the amount of data stored in the memory 104 exceeds the predetermined capacity, the main CPU 101 transfers the contents in the memory 104 to the hard disk unit 106 for protection thereof.

After the print data has been converted into the image data to be output to the printer engine 110, the engine controller 109 transfers the image data (final output data) converted from the print data by the main CPU 101, from the memory 104 or the hard disk of the hard disk unit 106 to the printer engine 110 to cause the same to carry out the printing process for forming an image on paper.

After completion of the printing process by the printer engine 110, in a step S204, the main CPU 101 of the printer 100 determines whether or not the print data received from the client PC 120 is for printing in the security print mode, based on the information of the print mode stored in the memory 104.

The method of determining whether or not the print data is for printing in the security print mode is not limited to the above method based on the information of the print mode, it is possible to employ various other methods.

For example, the present image processing apparatus may be configured that if the print data contains information indicating that the print data is secret or confidential, the print data is determined to be for printing in the security print mode.

In this case, the information indicating that the print data is secret or confidential may be in the form of a flag with reference to which the main CPU 101 determines whether or not the print data is to be erased after completion of printing operation.

Also, the print data may be determined to be for printing in the security print mode when the client PC 120 having transmitted the print data is a predetermined one (registered in the printer 100), or when information of a user having transmitted the print data is one of predetermined pieces of information (registered in the printer 100).

Further, when a predetermined keyword or a predetermined data pattern is included in the print data, the print data may be determined to be for printing in the security print mode.

If it is determined in the step S204 that the print data received from the client PC 120 is not for printing in the security print mode, the present process is immediately terminated. On the other hand, if it is determined in the same step that the print data received from the client PC 120 is for printing in the security print mode, the main CPU 101 determines in the following step S205 whether or not the printing process carried out in the step S203 has been normally terminated, i.e. completed.

If it is determined in the step S205 that an error has occurred during execution of the printing process, the process proceeds to a step S208, wherein the main CPU 101 causes the network controller 102 to transmit to the client PC 120 information of the error in the printing process, notifying, for example, that the printer 100 has fallen short of the output medium during output operation, and then, the process proceeds to a step S206. If it is determined in the step S205 that the printing process has been normally terminated, i.e. completed, the process also proceeds to the step S206, wherein the main CPU 101 erases all of the print data, the temporary data, the intermediate processing data, and the final output data, stored in the step S203 from the memory 104 and the hard disk of the hard disk unit 106, followed by terminating the present process.

As described hereinabove, according to the present embodiment, the printer 100 erases the print data transmitted from the client PC 120, the temporary data, and the intermediate processing data generated in the printer during execution of the printing process, and the final output data to be printed out by the printer engine 110, all of which are stored in the memory 104 and the hard disk of the hard disk unit 106, based on the erasing instruction, i.e. setting of the security print mode by the client PC 120, it is possible to prevent the above data from remaining unerased on the hard disk, after the power of the printer 100 has been turned off. This makes it possible to maintain high data security. Thus, the first embodiment of the present invention provides a convenient and highly secure image processing apparatus.

Next, a second embodiment of the present invention will be described.

In the first embodiment, there is employed only one security print mode for erasing data stored in the memory 104 and on the hard disk of the hard disk unit 106 of the printer, i.e. a single security print mode instructed by the client PC 120 to the printer 100. However, if the erasure of data stored on the hard disk unit 106 is determined based on the single security print mode, if the data stored on the hard disk unit 106 is very large in volume, it takes a very long time to erase it.

To cope with this problem of long erasure time, in the second embodiment of the present invention, the printer 100 is configured such that the print mode thereof can be set to any of a plurality of security print modes which define respective levels of erasure of data stored on the hard disk unit 106, including high-speed security print modes (e.g. defining an erasure level at which only a table indicating entities of data is erased, and an erasure level at which part of the data is erased by overwriting data thereon), to thereby make it possible to select a high-speed security print mode in which the data is erased at a high speed. It should be noted that the arrangement of the printer according to the second embodiment is the same as that of the first embodiment (see FIG. 1), and therefore detailed description thereof is omitted.

FIG. 3 is a diagram useful in explaining how data are erased from the hard disk of the hard disk unit 106 in a normal print mode and a plurality of security print modes of the printer 100 according to the second embodiment.

As shown in FIG. 3, the printer 100 can be set to a plurality of kinds of the security print modes (security print modes 1 to 5) in which data erasure is carried out, in addition to a normal print mode in which data erasure is not carried out. The security print modes 1 to 5 can be set via the keys 108 (setting means). The main CPU 101 of the printer 100 determines the kind of a security print mode set by the keys 108, and erases data stored on the hard disk according to the determined security print mode.

"Security print mode 1" is a highest-speed security print mode for erasing only a FAT (File Allocation Table: a management table indicating entities of data by storing use statuses of clusters as minimum storage units of a file stored on the hard disk) on the hard disk of the hard disk unit 106 used (having the contents of the memory 104 transferred thereto for protection thereof) in the printing process in FIG. 2 (step S203), without erasing the actual data (entities of the data) of the file.

"Security print mode 2" is a second highest-speed security print mode for writing arbitrary data of an arbitrary size over data blocks, starting with a start data block, of the actual data stored on the hard disk of the hard disk unit 106 used in the above printing process in FIG. 2 (step S203).

"Security print mode 3" is a third highest-speed security print mode for writing arbitrary data over the start data block and a plurality of arbitrary data blocks of the actual data stored on the hard disk of the disk unit 106 used in the printing process in FIG. 2 (step S203).

"Security print mode 4" is a fourth highest-speed security print mode in which the same processing as that in the step S206 in FIG. 2 according to the first embodiment is performed for erasing all the data blocks of the actual data-stored on the hard disk of the hard disk unit 106 used in the printing process in FIG. 2 (step S203), that is, for writing erasure data over all the data blocks.

"Security print mode 5" is a fifth highest-speed security print mode for writing arbitrary data over all the data blocks of the actual data stored on the hard disk of the hard disk unit 106 used in the printing process (step S203).

It should be noted that instead of manually setting a print mode to the printer 100 using the keys 108, information of the print mode may be sent from the client PC 120 to the printer 100 and the printer 100 may be set to any of the above print modes based on the information, similarly to the first embodiment.

As a further alternative, one of the security print modes may be selected based on information of the security level (or print mode) contained in the data stored on the hard disk of the hard disk unit 106, to erase the data in the selected security print mode.

As described above, according to the second embodiment, based on a security print mode manually or automatically selected and set to the printer 100 from a plurality of security print modes using the keys 108, the printer 100 erases, at high speed, print data transmitted from the client PC 120, temporary data, and intermediate processing data and final output data to be printed out by the printer engine 110 both generated by the printer 100 during execution of the printing process, from the hard disk of the hard disk unit 106. Therefore, it is possible to prevent the above data from remaining unerased on the hard disk, after the power of the printer 100 has been turned off. This makes it possible to maintain high data security. Thus, the second embodiment of the invention provides a convenient and highly secure image processing apparatus.

Next, a third embodiment of the present invention will be described.

An image processing apparatus (printer 100) according to the third embodiment is configured such that after carrying out printing in the normal print mode, the printer 100 erases data from the hard disk of the hard disk unit 106 in response to a security command from the client PC 120. This prevents the inconvenience of confidential or secret data remaining unerased on the hard disk of the hard disk unit 106.

In the third embodiment as well, similarly to the above first and second embodiments, it is possible to maintain high data security, and thereby provide a convenient and highly secure image processing apparatus.

Next, a fourth embodiment of the present invention will be described. An image processing apparatus (printer 100) according to the fourth embodiment is configured such that by operating the keys 108 (designating means) of the printer 100, data of a particular hard disk or all hard disks of the hard disk unit 106 can be erased in a desired one of the five security print modes of the second embodiment. This prevents the inconvenience of confidential or secret data remaining unerased on the hard disk of the hard disk unit 106.

Further, the printer 100 may be configured such that to prevent magnetic data from being read out from the hard disk of the hard disk unit 106, the printer 100 can be set to a mode (storage function-invalidating mode for invalidating the function of the hard disk unit 106) in which the hard disk of the hard disk unit 106 is damaged by bringing a magnetic reading head of the same into physical contact with the hard disk, thereby making it impossible to perform reading and writing on the hard disk any longer (e.g. in the case where the hard disk is scrapped), in addition to the above modes. This prevents data from being written onto or read from the scrapped hard disk.

In the present embodiment as well, similarly to the above first to third embodiments, it is possible to maintain high data security, thereby making it possible to provide a convenient and highly secure image processing apparatus.

Next, a fifth embodiment of the present invention will be described.

An image processing apparatus according to the fifth embodiment is applied to a multifunction machine having a plurality of functions including a printing function, a copying function, and a transmitting and receiving function. This multifunction machine can be set to a plurality of security print modes in which data erasure is carried out.

Figure 4:
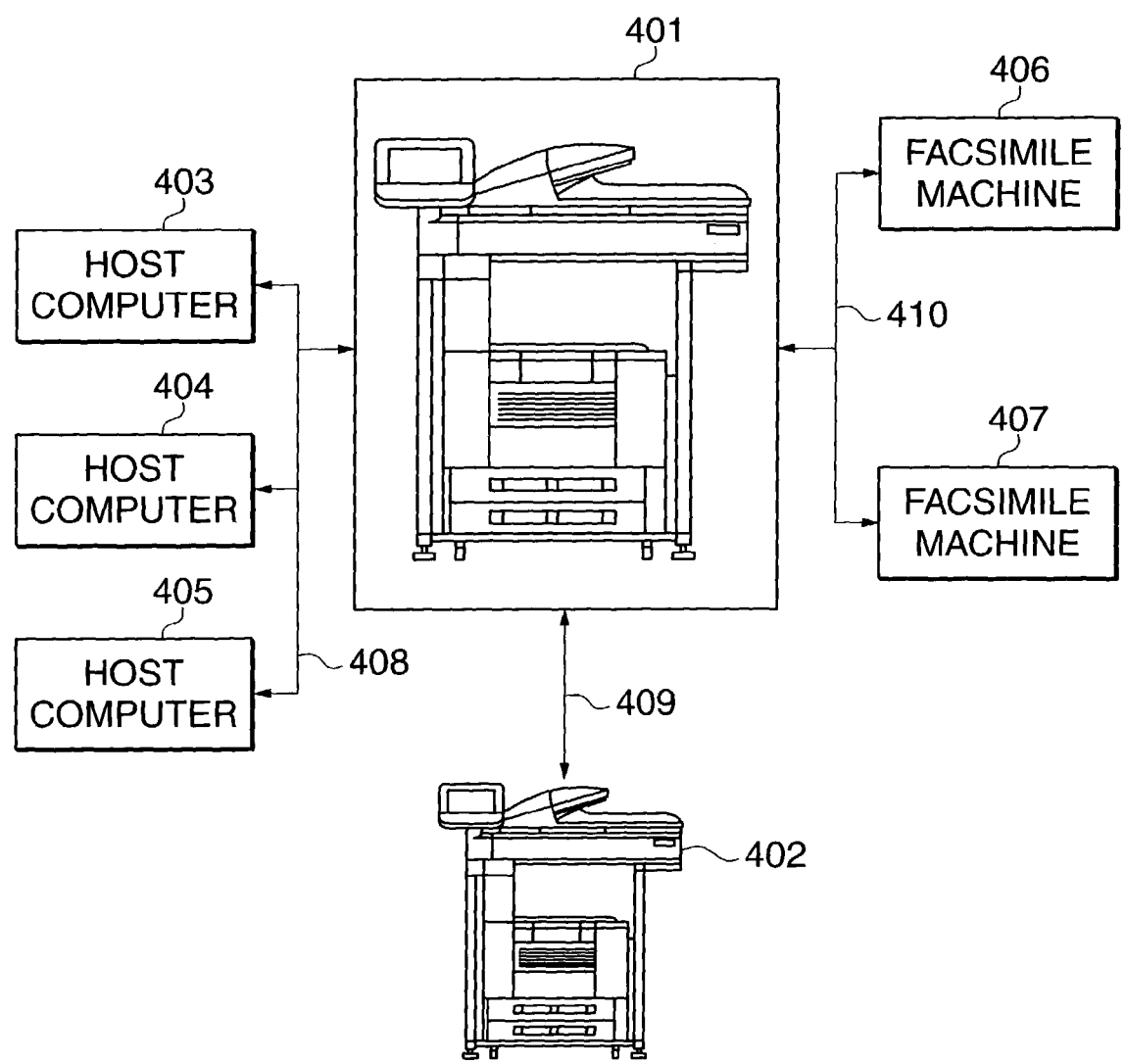
FIG. 4 is a block diagram showing the arrangement of a system including an image processing apparatus according to a fifth embodiment of the present invention.

FIG. 4 is a block diagram showing the arrangement of a system including the multifunction machine 401 according to the present embodiment.

As shown in FIG. 4, the system is comprised of the multifunction machine 401, a multifunction machine 402, a network 409 connecting between the multifunction machines 401, 402, host computers 403, 404, 405 which instruct the multifunction machines 401, 402 to carry out printout, a network 408 connecting between the host computers 403, 404, 405 and the multifunction machine 401, and facsimile machines 406, 407 connected to the multifunction machine 401 via a telephone line 410. It should be noted that the present invention can be applied to the system comprised of a plurality of machines as shown in FIG. 4, and also to a system formed by only one machine (e.g. multifunction machine 401 alone). Each host computer is equal with the client PC 120.

FIG. 5 is a block diagram showing the arrangement of the multifunction machine 401. It should be noted that the multifunction machine 402 is constructed similarly to the multifunction machine 401, and therefore a block diagram of the multifunction machine 402 and a description of components thereof are omitted.

As shown in FIG. 5, the multifunction machine 401 is comprised of a controller section 501, an operating section 503, an image reading section 504, an image memory section 505, a printer section 507, a data processing section 508, and external interface sections 509, 510, 511.

Figure 10:
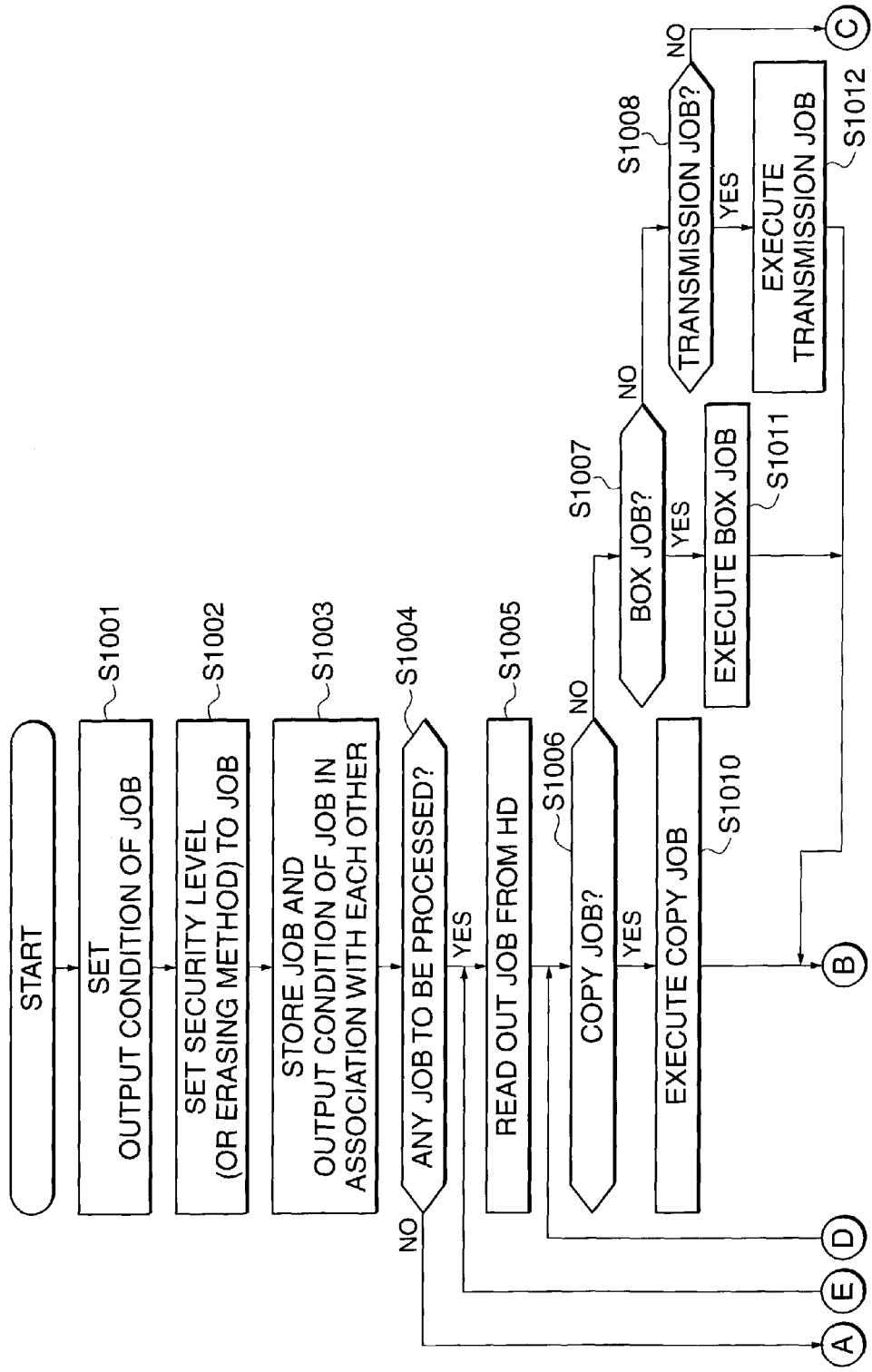
FIG. 10 is a flowchart showing an erasing process carried out by the image processing apparatus based on a security level or erasing method manually set to a job.
Figure 11:
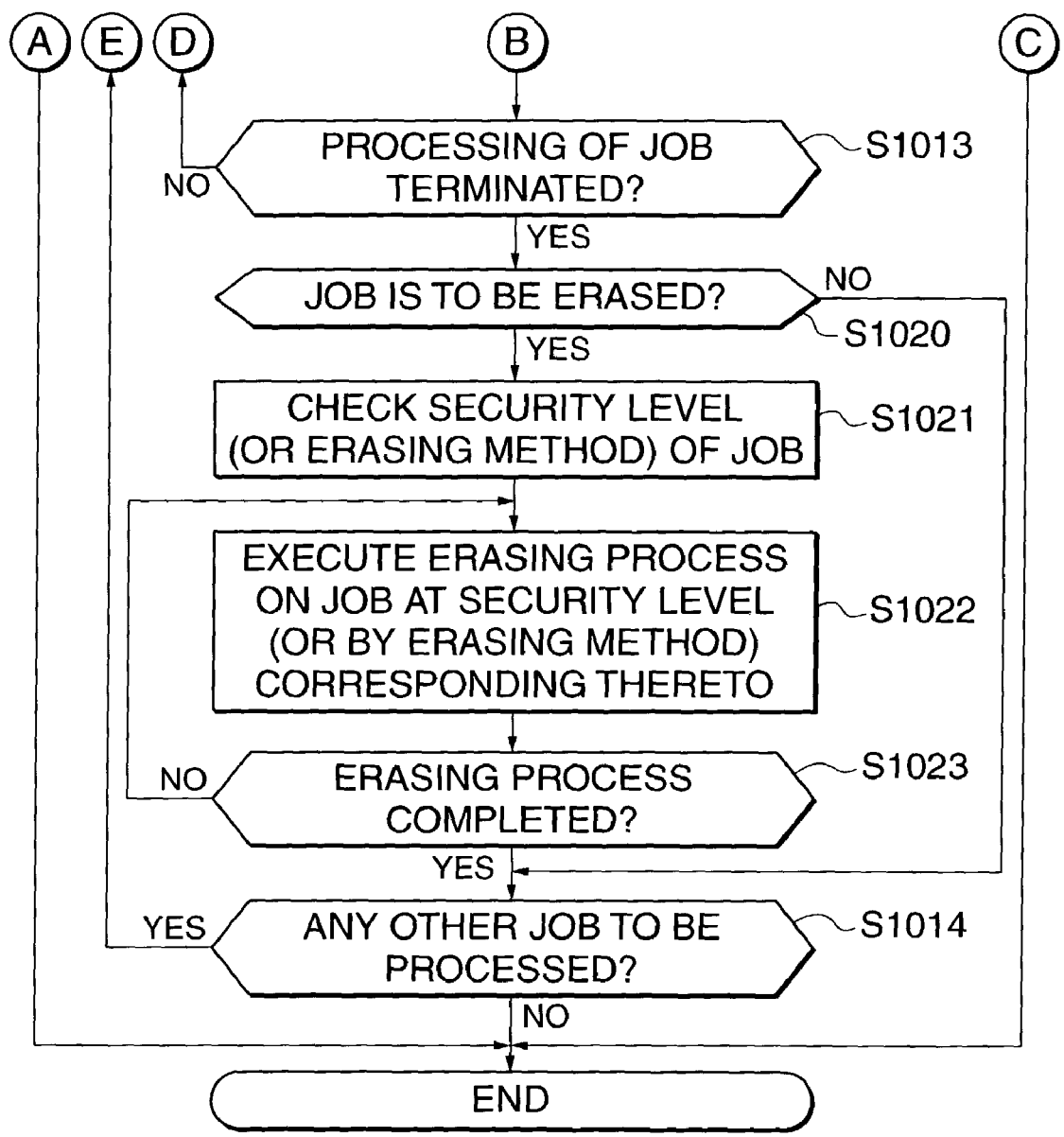
FIG. 11 is a continued part of the flowchart shown in FIG. 10.
Figure 15:
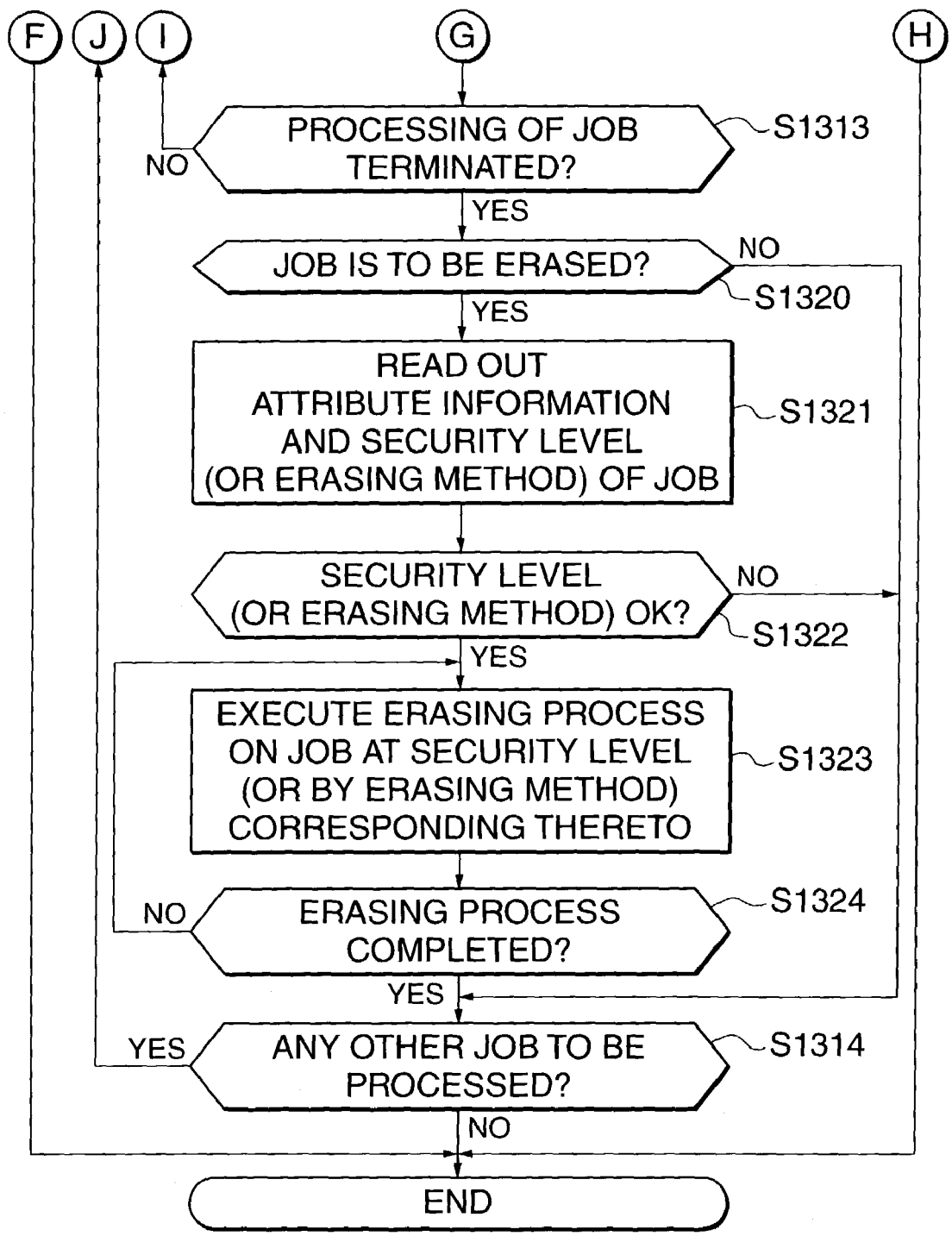
FIG. 15 is a continued part of the flowchart shown in FIG. 14.

The controller section 501 controls the overall operation of the multifunction machine 401 and includes a CPU 502 for carrying out a process (an erasing process based on the security level or an erasing method manually set to a job), a flowchart of which is shown in FIGS. 10 and 11, or a process (an erasing process based on the security level or an erasing method automatically set to a job), a flowchart of which is shown in FIGS. 14 and 15, according to a program therefor. The operating section 503 includes keys for inputting various settings (a scaling factor at which an image of an original copy is read, the number of copies to be printed, etc.) and a display for displaying various screens, referred to hereinafter. The image reading section 504 reads an image of an original and outputs data of the read image to the data processing section 508.

The image memory section 505 includes a hard disk 506 for storing the read image of the original, information of association between jobs and security levels, etc. The printer section 507 carries out printout, i.e. forms an image on paper based on print data supplied from the data processing section 508. The data processing section 508 carries out processing of image data formed and output by the image reading section 504, print data to be output to the printer section 507, data to be transmitted to and having been received from external apparatuses via the external interface sections 509 to 511, data for exchange with the controller section 501, data for exchange with the image memory section 505, etc.

The external interface section 509 is for communication with the host computer 403 external to the multifunction machine 401. The external interface section 510 is for communication with the facsimile machine 406 external to the multifunction machine 401. The external interface section 511 is for communication with the multifunction machine 402 as another image processing apparatus (corresponding to the multifunction machine 402 in FIG. 4) external to the multifunction machine.

FIGS. 6A to 6D are views showing various screens displayed on the operating section 503 of the multifunction machine 401. User interface (UI) screens including the operation screens shown in FIGS. 6A to 6D, and operation screens shown in FIGS. 7 and 8, referred to hereinafter, are registered in the internal memory of the present machine (multifunction machine 401 or 402), and under the control of the CPU 502 of the controller section 501 (conditions for displaying the above screens and examples of control of timing therefor will be described hereinafter), they can be displayed on the operation panel of a touch panel type of the operating section 503.

Figure 6A:
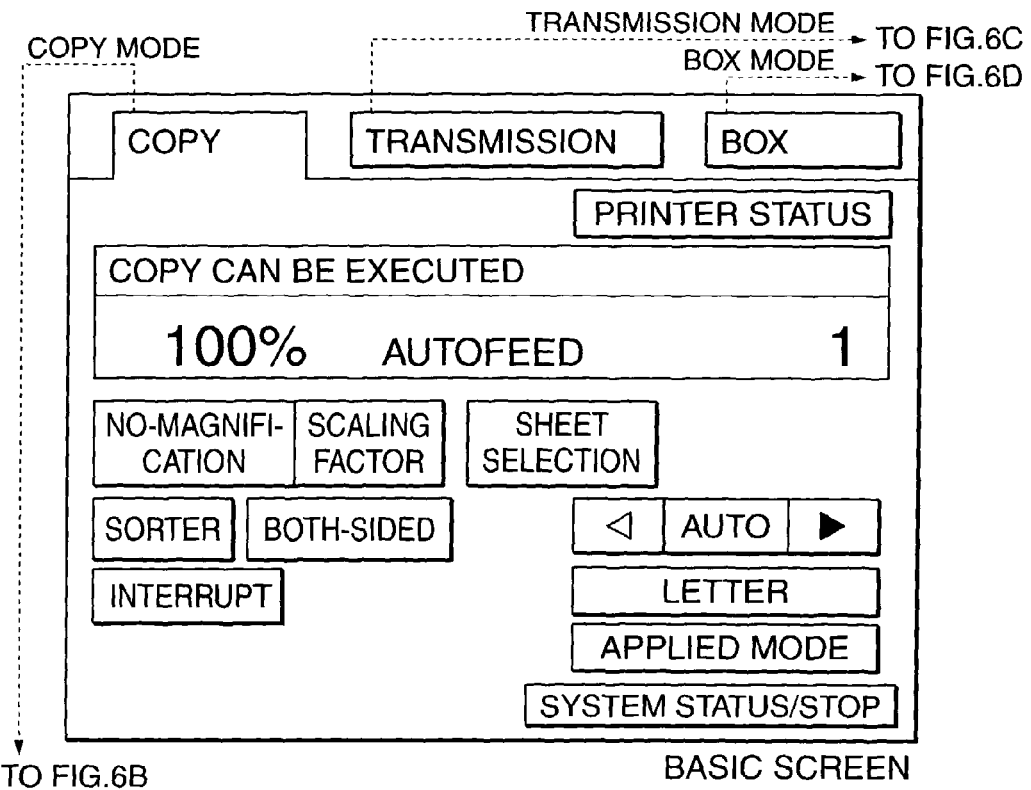

FIG. 6A shows a basic screen displayed when the power of the multifunction machine 401 is turned on. At an upper part of the basic screen, there are displayed three tabs: "copy", "transmission", and "box". From a central part to a lower part of the basic screen, there are arranged a display portion showing a scaling factor for copying and a sheet size, a non-magnification key, a scaling factor key, a sheet selection key, a sorter key, a double-sided copy key, an interrupt key, etc. In the present embodiment, a copy function screen (screen for the copy mode) is set to the basic screen (default screen) by the user and registered as such, and therefore the copy function screen is displayed as the basic screen as shown in FIG. 6A.

Figure 6B:
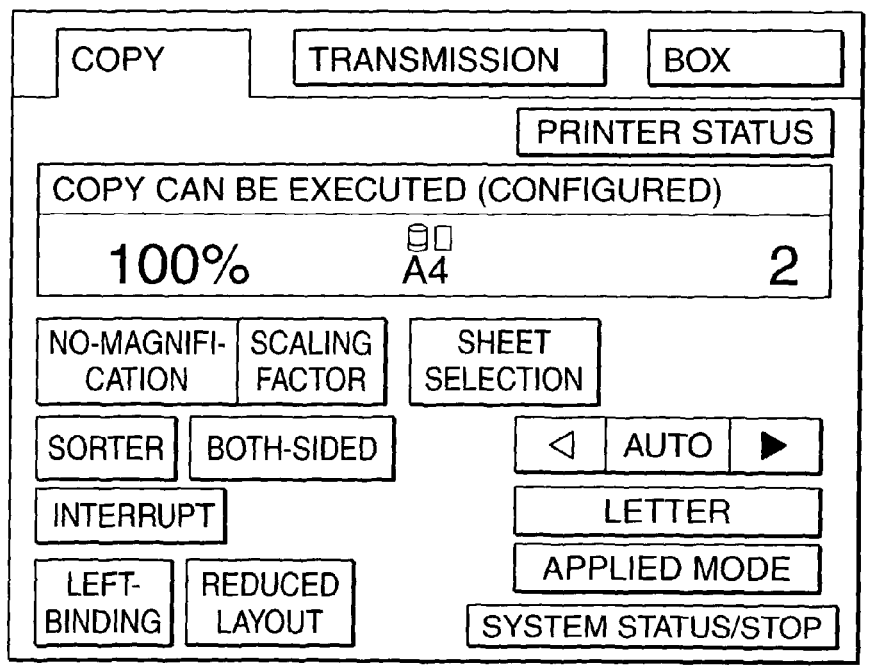

FIG. 6B shows the copy function screen displayed on the operating section 503 when the "copy" tab at the upper part is selected by the user when the basic screen shown in FIG. 6A, or when other screens (shown in FIGS. 6C and 6D) than the basic screen are displayed. In a copy mode to which the multifunction machine 401 can be set via the copy function screen, an image is read from a copying object (e.g. a sheet of an original) placed on an original copy placing section of the image reading section 504 and a copy of the read image is formed on a sheet by the printer section 507. For example, the user can set a scaling factor at which an original is magnified or reduced in the copy mode, a sheet selected for printing, a sorter mode, a double-sided mode, an applied mode, a font, etc. The controller section 501 controls the units of the multifunction machine 401 such that a printing job in the copy mode is processed according to parameters set via the operation screen.

Figure 6C:
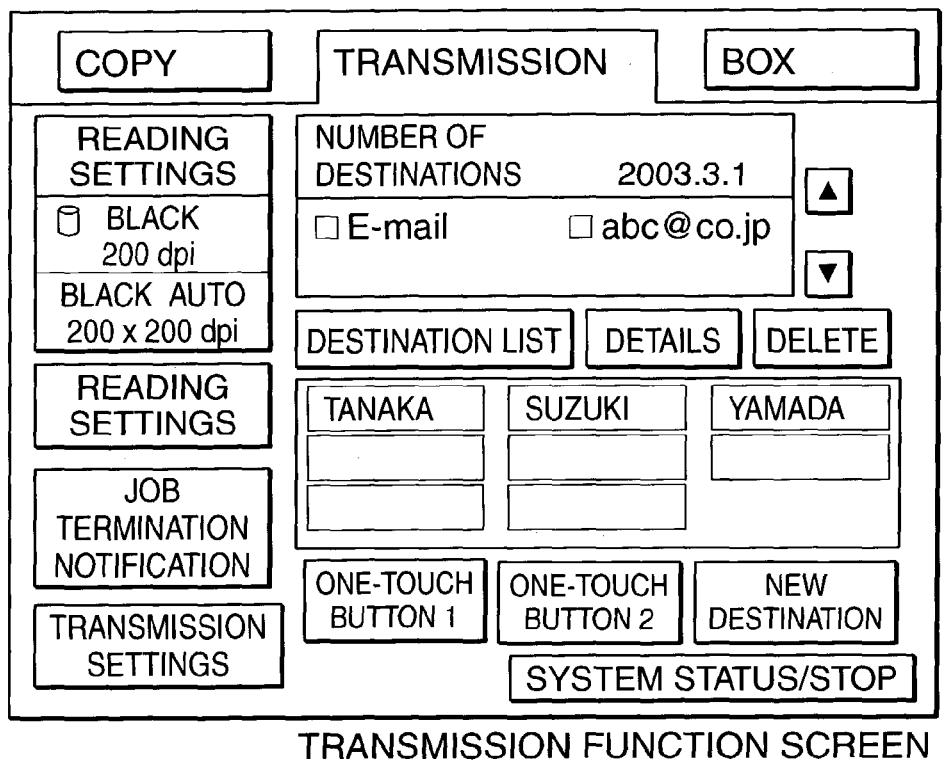

FIG. 6C is a UI screen for setting a transmission mode with respect to a job to be processed, i.e. a transmission function screen displayed on the operating section 503 e.g. when the "transmission" tab at the upper part is selected from the basic screen shown in FIG. 6A by the user. In a transmission mode to which the multifunction machine 401 can be set from the transmission function screen, an image is read from an original to be processed (e.g. an original sheet) placed on the original copy-placing section of the image reading section 504 and data of the read image is transmitted to an external apparatus, such as the host computer 403 by e-mail for example, the facsimile machine 406, or the multifunction machine 402 as another image processing apparatus, via the external interface sections 509 to 511. From this screen, the user can effect various settings of a job to be processed in the transmission mode, including a resolution of an image read by scanning, the number of transmissions of the job, a transmission method, such as an E-mail transmission or a facsimile transmission, a destination of transmission, which are used as parameters of the job. The controller section 501 causes the job in the transmission mode to be processed according to the above parameters.

Figure 6D:
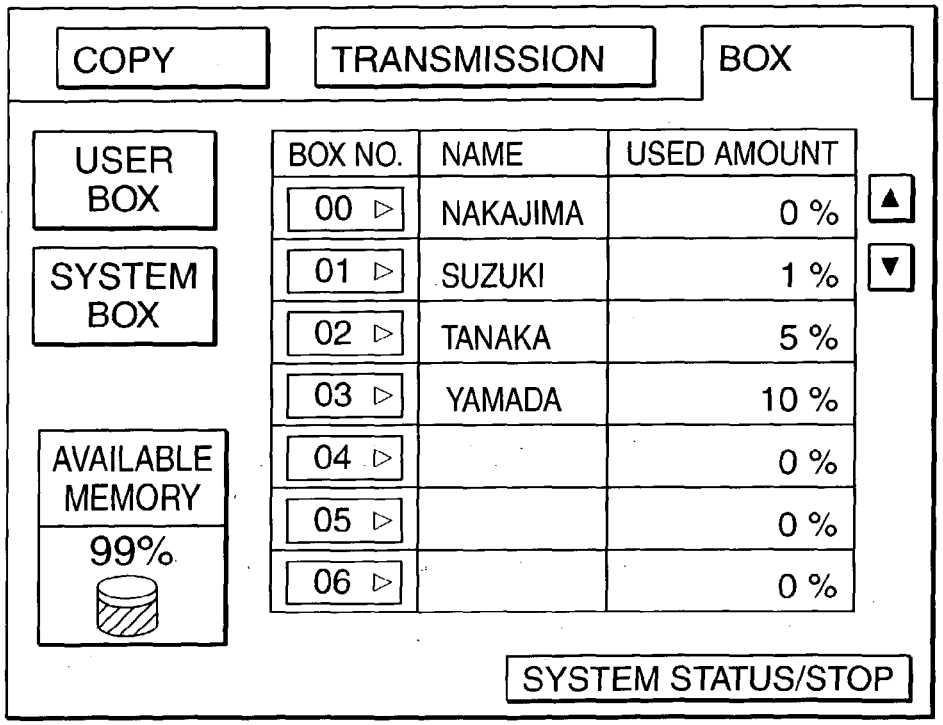

FIG. 6D is a UI screen for setting a box mode with respect to a job to be processed, i.e. a box function screen displayed on the operating section 503 when the "box" tab at the upper part is selected from the basic screen shown in FIG. 6A by the user. In the box mode to which the multifunction machine 401 can be set from the box function screen, an image can be read from an original to be processed (e.g. an original sheet) placed on the original copy-placing section of the image reading section 504 and data of the read image is stored in a predetermined area (box area) of the image memory section 505 of the multifunction machine 401, or the data of the read image stored in the predetermined area (box area) of the image memory section 505 can be output by the user's operation via the operating section 503 to the printer section 507 to produce a printout, i.e. form an image on paper, or the image data stored in the box area can be transmitted to an external apparatus, such as the host computer 403, the facsimile machine 406, or the multifunction machine 402 as another image processing apparatus 402, via the external interface sections.

In the present embodiment, a plurality of storage areas (box areas) are virtually prepared on the hard disk 506 such that users can use the box areas on a user-by-user basis. Therefore, when the box mode is selected, the user is allowed to effect configurations of the box mode, such as selection of a box area in which image data should be stored and from which image data should be read, from the plurality of box areas, and setting of printout of image data.

In the multifunction machine 401, in execution of each of a copy job, a transmission job, and a box job in the copy, transmission, and box modes which can be set from the copy, transmission, and box function screens shown in FIGS. 6B to 6D, respectively, it is possible to change the displayed screen to a job security level-setting screen for setting a security level to the job.

Figure 7:
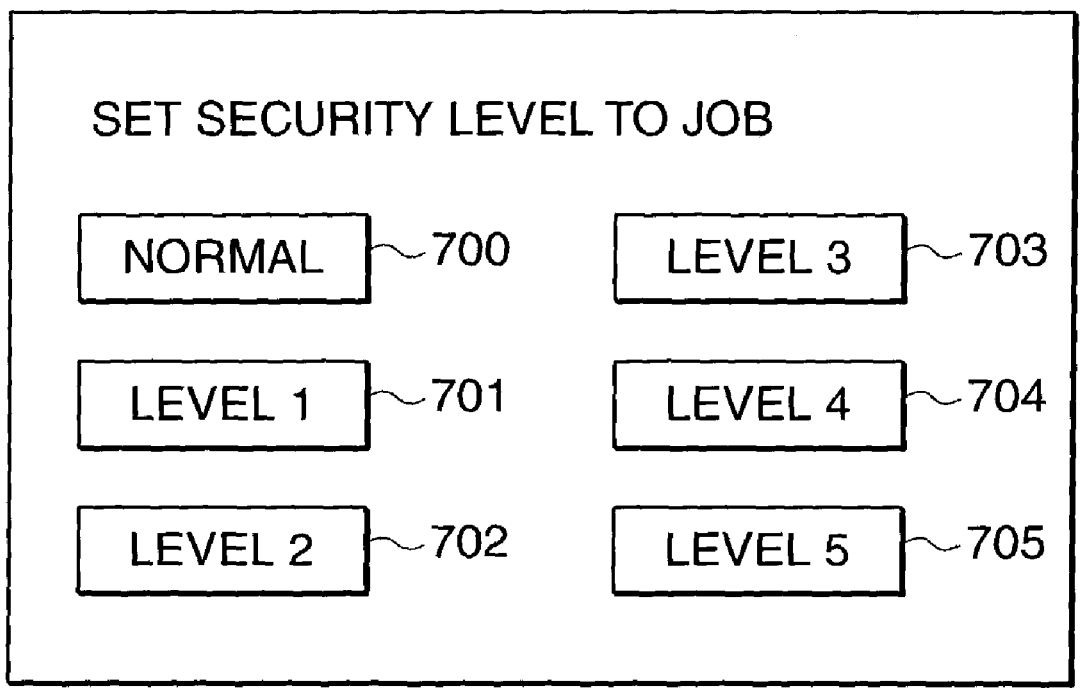
FIG. 7 is a diagram schematically showing a job security level-setting screen displayed on the operating section of the image processing apparatus.

FIG. 7 shows the job security level-setting screen displayed on the operating section 503 of the multifunction machine 401. From the screen shown in FIG. 7, a security level is set e.g. in association with a job to be processed. The security level is concerned with a data erasing process to be executed on a job stored on the hard disk 506, and in the present embodiment, it enables the user to select a desired one of a plurality of methods of data erasure (five methods of erasing data from the hard disk 506 in the present embodiment) on a job-by-job basis.

It should be noted that in the present embodiment, "erasing process (or data erasing process)" is defined as a process for inhibiting reading of data stored in a memory (hard disk 506 in the present embodiment; this is not limitative, but applicable to various kinds of non-volatile memories), in other words, processing of changing a state in which data can be read from the memory to a state in which the data cannot be read therefrom.

Therefore, a process of actually erasing actual data (image data) from the memory is one of types of the data erasing process, and a process of erasing information (address data or the like) of a management table (FAT or the like) used for reading actual data (image data) also falls in the category of the data erasing process. That is, the process for changing a first state in-which data stored in the memory can be read therefrom and a second state in which the data stored in the memory cannot be read therefrom is called the data erasing process.

In the present embodiment, there are a plurality of available erasing modes in which the data erasing process is carried out (five erasing methods corresponding to security levels 1 to 5), and the controller section 501 (CPU 502) provides control such that the data erasing process is carried out in a manner meeting the user's needs.

It should be noted in the present embodiment, a description will be given of data erasing methods by taking the hard disk 506 installed in the present machine (multifunction machine 1 or 2) as an example of the storage means. The present invention, however, is applicable to any storage means insofar as the storage means can store a plurality of image data (jobs) which can be processed by the image processing apparatus, such as the digital multifunction machine used in to the present embodiment. That is, the storage means may be another memory within the present machine other than the hard disk or a hard disk unit removably mountable on the present machine insofar as the storage means can store a plurality of jobs.

Further, the storage means may be storage means of an external apparatus (host computer, print server, or the like) that can communicate with the present machine via a signal line. The multifunction machine 1 is configured such that to erase a job stored in the storage means of the external apparatus, such as the host computer or the print server, for example, the controller 501 is capable of controlling the execution of the data erasing process according to the present embodiment on the job e.g. by issuing a job-erasing command to the external apparatus.

The data erasing method of the present embodiment can be applied in any of the above forms.

For example, one job is comprised of a series of data to be processed. For example, when an original to be processed is formed by one page, the one page corresponds to one job, and when an original to be processed is formed by a plurality of pages, these pages correspond to one job.

Then, in the present embodiment, under the control of the controller 501, by executing various processes including the forming and managing of table data, described hereinafter with reference to FIGS. 9, 12, 13, and so forth, it is possible to designate a data erasing method for each job to be processed, on a job-by-job basis, and when a plurality of jobs are stored on the hard disk 506, it is possible to set a desired security level (erasing method) to each job on a job-by-job basis thereby enabling the data erasing process to be performed on each job by the desired data erasing method.

The conditions for displaying the setup screen shown in FIG. 7 and timing for displaying the same are as follows: The controller 501 provides control such that the setup screen shown in FIG. 7 is displayed on the operating section 503 in timing interlocked with selection of a processing mode (copy mode, transmission mode, or box mode) by the user or in timing interlocked with setting of various parameters of the processing mode by the user, which parameters are selected via one of the screens shown in FIGS. 6A to 6D (if the selected processing mode is the copy mode, setting of various parameters for the copy mode, such as a scaling factor, a sheet, an applied mode, an interruption mode; if the selected processing mode is the transmission mode, setting of various parameters for the transmission mode, such as a destination of transmission; if the selected processing mode is the box mode, setting of various parameters for the transmission mode).

For example, the user selects the copy mode via the setup screen shown in FIG. 6A or 6B, sets various parameters for the copy mode, and then depresses a confirming key (OK key), not shown. Responsive to this, the controller section 501 causes the setup screen shown in FIG. 7 to be displayed on the operating section 503. Then, in response to setting of one of a plurality of security levels (erasing methods) by the user via the screen, the controller section 501 registers the security level in association with the job to be processed in the copy mode (details of the method of the association is set by the management table, referred to hereinafter), and registers the job (image data) on the hard disk 506. Then, in response to completion of processing of the job to be processed in the copy mode (copy job) according to processing conditions set by the user (in response to completion of the copying process), the controller section 501 causes the data erasing process to be carried out on the copy job (image data) which is stored on the hard disk 506 and processing of which is completed, according to the security level registered in association with the copy job.

Similarly, for example, the user selects the transmission mode via the setup screen shown in FIG. 6C, and sets various parameters of a job to be processed in the transmission mode, and then depresses the confirming key (OK key), not shown. Responsive to this, the controller section 501 causes the setup screen shown in FIG. 7 to be displayed on the operating section 503. Then, in response to setting of one of a plurality of security levels (erasing methods) by the user via the screen, the controller section 501 registers the security level in association with the job to be processed in the transmission mode (details of the method of the association are set by the management table, referred to hereinafter), and registers the job (image data) on the hard disk 506. Then, in response to completion of processing of the job in the transmission mode (transmission job) according to processing conditions set by the user (in response to completion of the transmission process), the controller section 501 causes the data erasing process to be carried out on the job (image data) stored on the hard disk 506 and the processing of which has been completed, according to the security level registered in association with the transmission job.

Similarly, as to a job to be processed in the box mode (box job), the controller section 501 causes the setup screen shown in FIG. 7 to be displayed in a manner interlocked with various settings via the setup screen of the box mode, sets the security level in association with box job, and after completion of processing of the box job, causes the data erasing process to be carried out according to the security level set in association with the job.

It should be noted that the present digital multifunction machine 401 is also capable of operating in a print mode in which a job (print job) can be received from an external apparatus (host computer), and the job input from the external apparatus is stored on the hard disk and printed.

In this print mode, the user is prompted to set output conditions of a job (image size, sheet size, image forming mode, etc.) at an operation screen of a printer driver of the external apparatus. In accordance therewith, an operation screen similar to the setup screen shown in FIG. 7 or the setup screen shown in FIG. 8, referred to hereinafter, is displayed on the display of the external apparatus, and the user is prompted to set the security level or the erasing method for the job. Then, in response to setting of output conditions and the security level or the erasing method for the job and pressing of an OK button (or OK key) via the operation screen of the external apparatus, the data of the print job with these settings are caused to be transmitted from the external apparatus. The digital multifunction machine 401 receives the data, and the CPU 502 of the controller section 501 causes the print job and output conditions of the job as well as the security level to be stored on the hard disk in association with each other. For example, these data are updated in association with the management table shown in FIG. 9. Then, in erasing the print job, the CPU 502 causes the print job to be erased from the hard disk 506 by the erasing mode dependent on the security level or erasing method set to the print job.

From the job security level-setting screen shown in FIG. 7, it is possible to set a desired security level to a job to be processed by allowing the user to select one of the following buttons displayed on the screen. The description, characteristics, and properties of erasing methods associated with the security levels are shown in FIG. 16. It should be noted that while FIG. 16 shows details of the erasing methods, the description thereof is the same as that given in the second embodiment and therefore, omitted here.

In the present embodiment, there are provided in advance a plurality of erasing methods associated with security levels, respectively, which have features peculiar thereto (in respect of high speed, or security and reliability), and the user is allowed to set a desired erasing method for each job to be processed by the digital multifunction machine (the erasing method can be set on a job-by-job basis).

Referring to FIG. 16, if Security level 1 to Security level 5 (i.e. Security print mode 1 to Security print mode 5) are put in the order of increasing processing time taken for data erasure, the result can be expressed by the inequality of Security level 1 (data is erased by writing predetermined data over only management information of a management table for reading out actual data)> Security level 2 (data is erased by writing arbitrary data over the start data block of actual data) > Security level 3 (data is erased by writing arbitrary data over the start data block and arbitrary data blocks of actual data)> Security level 4 (data is erased by writing erasure data over all data blocks of actual data )> Security level 5 (data is erased by writing arbitrary data over all data blocks of actual data).

In the present embodiment, the job set to Security level 1 is capable of having the data thereof erased at a highest speed. Further, if the security levels are put in the order of decreasing security, the result can be expressed by the inequality of Security level 5> Security level 4> Security level 3> Security level 2> Security level 1. In the illustrated example, the job set to Security level 5 is capable of having the data thereof erased at a highest reliability and security. Thus, the high speed of data erasure and the high security of data erasure are made compatible, and furthermore, data erasing methods meeting needs of users can be selectively designated on a job-by-job basis.

A "NORMAL" button, designated by 700, on the setup screen in FIG. 7 is for setting no security level (for setting, so to speak, "Security level 0"). If the "NORMAL" button is pushed (or clicked) by the user to set Normal print mode to a job to be processed, the controller section 501 provides control such that the job is not erased from the hard disk 506 (the data is controlled to be preserved on the hard disk 506, and read out as required).

A "LEVEL 1" button, designated by 701, on the setup screen in FIG. 7 is for setting Security level 1 at which data erasure is effected by erasing data of a management table (FAT) stored on the hard disk 506. If the "LEVEL 1" button is pushed (or clicked) by the user to set Security print mode 1 (i.e. Security level 1) to a job to be processed, the controller section 501 provides control such that the job is erased by erasing management information (address data or the like) for reading the data from the hard disk 506 (the management information is erased by writing predetermined data (000000, . . . , in the illustrated example) over the data of the information). In this case, only the management information of the management table is erased, and hence the actual data (image data) remains stored on the hard disk 506. However, it is possible to inhibit the data from being read from the hard disk by the above processing in this mode, since the management information itself which is necessary for reading the data from the hard disk 506 is erased. The "LEVEL 1" button 701 is for instructing execution of this data erasing method. A "LEVEL 2" button, designated by 702, on the setup screen in FIG. 7 is for setting Security level 2 at which data erasure is effected by writing arbitrary data (XXXXXX . . . in the illustrated example). If the "LEVEL 2" button 702 is pushed (clicked) by the user to set Security Level 2 (i.e. Security print mode 2) to a job to be processed, the controller section 501 provides control such that the job is erased by writing the arbitrary data over data corresponding to the start data block of actual data (image data) of the job stored on the hard disk 506. This makes it impossible to read out the image data of the job from the hard disk. The "LEVEL 2" button 702 is for instructing execution of this data erasing method. A "LEVEL 3" button, designated by 703, on the setup screen in FIG. 7 is for setting Security level 3 at which data erasure is effected by writing arbitrary data over the start data block and arbitrary data blocks of actual data stored on the hard disk 506. If the "LEVEL 3" button 703 is pushed (clicked) by the user to set Security Level 3 (i.e. Security print mode 3) to a job to be processed, the controller section 501 provides control such that the job is erased by writing the arbitrary data over data corresponding to the start data block and data corresponding to arbitrary data blocks of actual data (image data) of the job stored on the hard disk 506. This makes it impossible to read out the image data of the job from the hard disk 506. The "LEVEL 3" button 703 is for instructing execution of this data erasing method.

A "LEVEL 4" button designated by 704 is for setting Security level 4 at which data erasure is effected by writing erasure data over all the data blocks of actual data stored on the hard disk 506. If the "LEVEL 4" button 704 is pushed (clicked) by the user to set Security Level 4. (i.e. Security print mode 4) to a job to be processed, the controller section 501 provides control such that the job is erased by writing the erasure data over data corresponding to all the data blocks of actual data (image data) of the job stored on the hard disk 506. This makes it impossible to read out the image data of the job from the hard disk 506. The "LEVEL 4" button 704 is for instructing execution of this data erasing method.

A "LEVEL 5" button designated by 705 is for setting Security level 5 at which data erasure is effected by writing arbitrary data over all the data blocks of actual data stored on the hard disk 506. If the "LEVEL 5" button 705 is pushed (clicked) by the user to set Security Level 5 (i.e. Security print mode 4) to a job to be processed, the controller section 501 provides control such that the job is erased by writing the arbitrary data over data corresponding to all the data blocks of actual data (image data) of the job stored on the hard disk 506. This makes it impossible to read out the image data of the job from the hard disk 506. The "LEVEL 5" button 705 is for instructing execution of this data erasing method.

Figure 8:
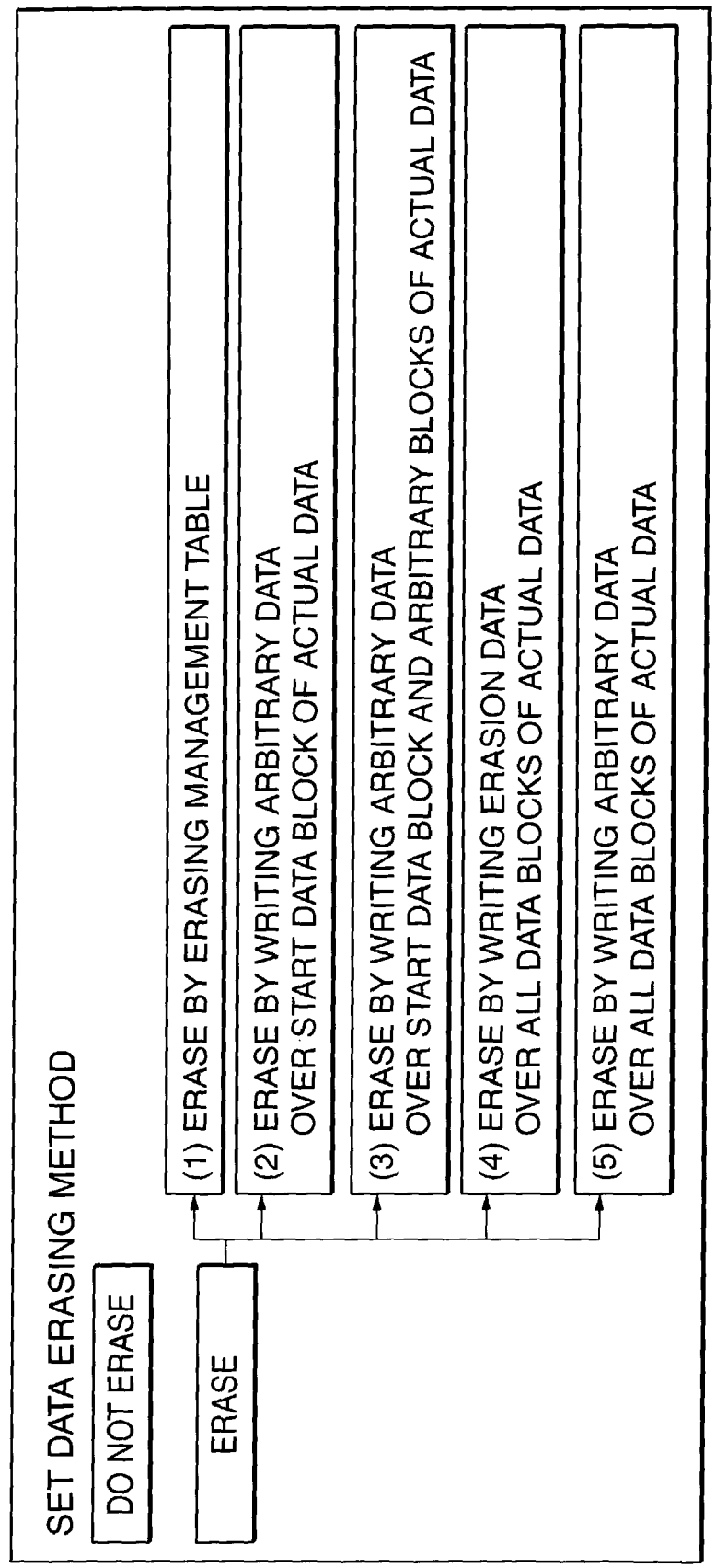
FIG. 8 is a diagram schematically showing a data erasing method-setting screen displayed on the image processing apparatus.

Although in the present embodiment, the user sets the security levels of jobs on a job-by-job basis via the job security level-setting screen illustrated in FIG. 7 to instruct the data erasure, this is not limitative, but, for example, the controller section 501 may provide control such that a data erasing method-setting screen, as shown in FIG. 8, in which a plurality of methods of data erasure are described in detail is displayed on the operating section 503, and the user can set methods of erasing data on a job-by-job basis via the setup screen shown in FIG. 8. It should be noted that the conditions for displaying the setup screen in FIG. 8 and timing for displaying the same is controlled by the controller section 501 in the same manner as the setup screen shown in FIG. 7 is displayed.

FIG. 8 is a diagram schematically showing the data erasing method-setting screen displayed on the operating section 503 of the multifunction machine 401.

Via the data erasing method-setting screen shown in FIG. 8, it is possible to select either of options of "Do not erase" and "Erase". When the option "Erase" is selected, it is possible to select the data erasing method from (1) a method of erasing the management table, (2) a method of writing arbitrary data over the start data block of actual data, (3) a method of writing arbitrary data over the start data block and arbitrary data blocks of actual data, (4) a method of writing erasure data over all the data blocks of actual data, and (5) a method of writing arbitrary data over all the data blocks of actual data.

The controller section 501 controls the data erasing process such that data erasure can be executed on a job-by-job basis according to the method designated via the setup screen shown in FIG. 8. The above erasing method of (1) is the same as that employed for Security level 1, and the erasing methods of (2) to (5) are also the same as those employed for Security level 2 to Security level 5. Since these methods are the same as described as to the above second embodiment and described with reference to FIG. 16, description thereof is omitted.

Figure 9:
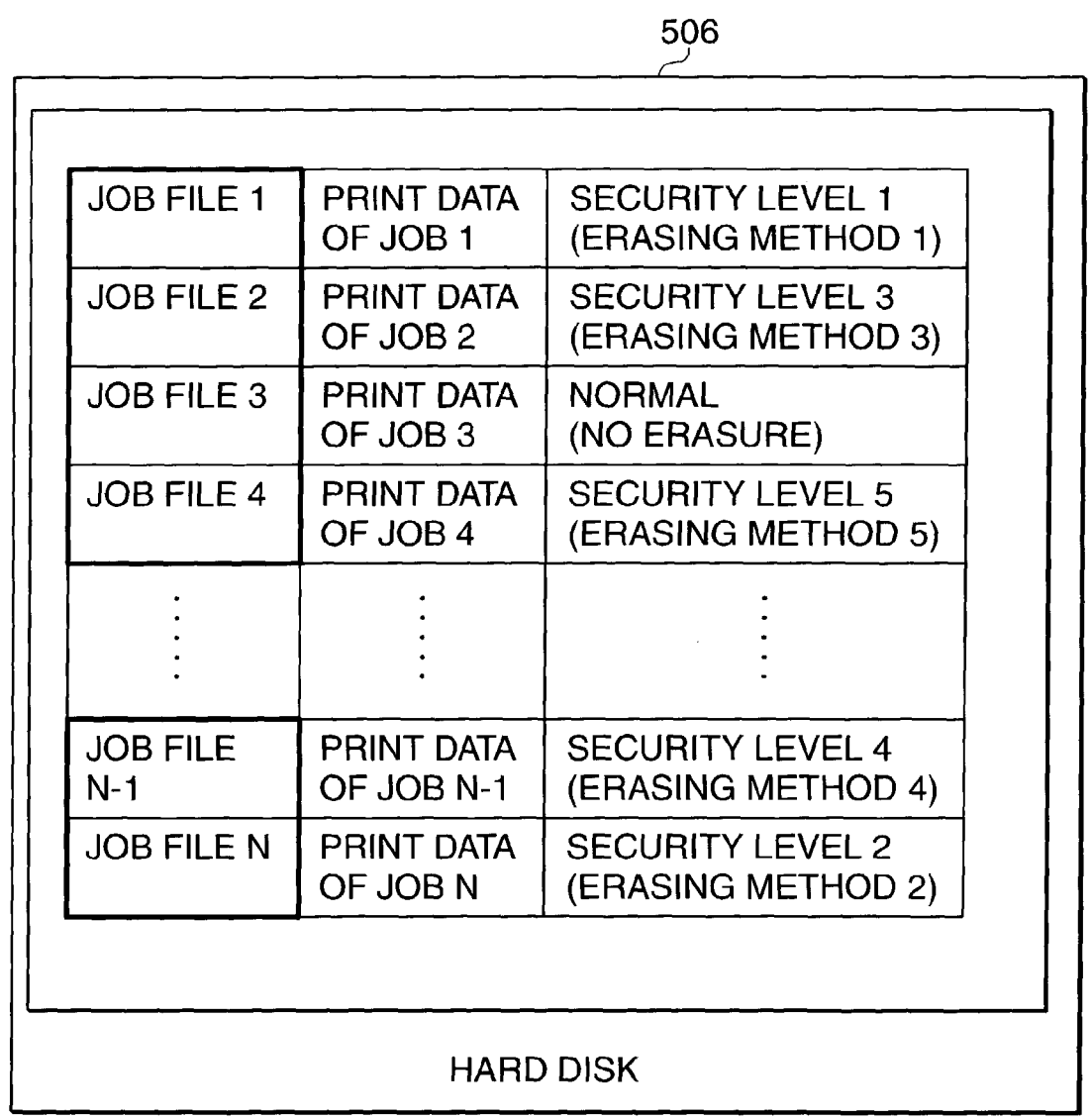
FIG. 9 is a diagram showing in a tabulated form job files which are stored on a hard disk of the image processing apparatus in association with security levels or erasing methods.

FIG. 9 is a diagram showing, in a tabulated form, job files which are stored on the hard disk 506 of the multifunction machine 401 in association with security levels or erasing methods set thereto.

Responsive to the setting of the data erasing method by the user to data stored on the hard disk 506 on a job-by-job basis via the setup screen shown in FIG. 7 or FIG. 8, the controller 501 prepares table data of job files in a tabulated form as shown in FIG. 9, for storage in a memory, not shown, and sequentially updates the same, for managing information concerning the data erasure as management information. Further, the controller section 501 enables the data erasure to be executed in a desired manner on a job-by-job basis, by reading out the management information as required.

As shown in FIG. 9, job files 1 to N comprised of data of components of jobs 1 to N, and print data of the jobs 1 to N, and security levels or erasing methods set to the jobs are stored on the hard disk 506 in association with each other. This enables the controller section 501 to manage a plurality of jobs stored on the hard disk 506, on a job-by-job basis, in association with the designated security level or erasing method.

Next, an erasing process carried out on a job by the multifunction machine 401 will be described with reference to FIGS. 10 and 11.

FIGS. 10 and 11 form a flowchart of the erasing process carried out by the multifunction machine 401 based on manual setting of a security level or erasing method to a job. The process shown in this flowchart is executed by the CPU 502 of the controller section 501 of the multifunction machine 401.

First, in a step S1001, the user sets output conditions of a job via the operating section 503 of the multifunction machine 503. To set the output conditions of a job, the user sets the job to one of a copy job, a box job, and a transmission job, for example. If the user selects the copy mode via the setup screen shown in FIG. 6A or 6B, for example, the conditions for outputting a job in the copy mode (copy job) are set. If the user selects the transmission mode via the setup screen shown in FIG. 6C, the conditions for outputting a job in the transmission mode (transmission job) are set. If the user selects the box mode via the setup screen shown in FIG. 6D, the conditions for outputting a job in the box mode (box job) are set.

Responsive to completion of selection of a mode and setting of various parameters by the user in the step S1001 (responsive to pressing of the confirming key of the operating section), the controller section 501 (CPU 502) causes the setup screen shown in FIG. 7 or FIG. 8 to be displayed.

In a step S1002, the user sets a security level or a data erasing method to the job set in the step S1001 via the operating section 503. Details of the security levels or the erasing methods were described hereinbefore with reference to FIG. 7 (job security level-setting screen) and FIG. 8 (data erasing method-setting screen).

It should be noted that in the print mode, the output conditions are set via the printer driver of a host computer, and at the same time, via the operation screen as shown in FIG. 7 or FIG. 8 displayed on the host computer, the user sets the security level or erasing method. Then, data commands for the settings are issued together with the job in the print mode to the multifunction machine 401. Therefore, in the case of a job in the print mode, the steps S1001, S1002 are skipped, and the process directly proceeds to the step S1003.

In a step S1003, the CPU 502 stores the job set in the step S1001 and the security level of the job set in the step S1002 on the hard disk 506 in association with each other. For association of jobs and security levels (or erasing methods) and methods of management thereof, the table data as shown in FIG. 9 are prepared as described above (although in an example described hereinafter, table data are prepared on the hard disk 506, this is not limitative, but the management information may be stored in any memory unit), thereby enabling management of the association in the form of job files. However, this is not limitative, but insofar as the security levels or erasing methods of a plurality of jobs stored on the hard disk 506 can be managed on a job-by-job basis in a discriminating fashion, any management method may be employed. In the present embodiment, three kinds of information, i.e. the output conditions and the security levels (or erasing methods) are associated with each other on a job-by-job basis, for registration.

In a step S1004, the CPU 502 determines whether or not a job to be processed by the multifunction machine 401 exits, i.e. a job is stored on the hard disk 506. To carry out determination in the step S1004, a job queue is prepared, for example, in which jobs are sequentially registered in the order of entry whenever a job is entered, and the job queue is checked as required. Thus, it is determined whether or not a job to be processed exists on the hard disk 506. If the hard disk 506 does not store any job to be processed, the present process is immediately terminated.

If a job to be processed exits on the hard disk 506, in the following step S1005, the job to be processed is read out from the hard disk 506. Hereafter, the following process is carried out depending on the kind of job to be processed (copy job, box job, or transmission job).

If it is determined in a step S1006 that the job to be processed is a copy job in which an image of an original is read and a copy of the read image is formed on paper, the CPU 502 causes the image reading section 504 and the printer section 507 to carry out the copy job in a step S1010.

It should be noted that in printing the image read in the copy mode, the read image is once stored on the hard disk 506, and read from the hard disk 506 a required times for printing, whereby a required number of prints can be produced. This is called "electronic sorting function".

If it is determined in a step S1007 that the job to be processed is a job in the box mode (box job), such as storing data of an image in the image memory section 505, the CPU 502 registers the job in a box in a step S1011. In the case of the box mode, the user is prompted to designate one of a plurality of storage areas (box areas) virtually allocated in the hard disk 506, and the controller section 501 causes the job entered from the image reading section 504 or an external apparatus to be stored in the designated area (box area).

It should be noted that in the case of the box mode, there are a method of registering data of originals input from the image reading section 504 of the present machine in the box area, a method of registering data of originals input from an external apparatus, such as a computer, in the box area, etc. The present invention can be applied to both of the methods.

Further, when a job is stored in the box area, the job is stored after associating the output conditions of the job (size of an original, printing sheet size, various parameters to be applied in the print mode), a security level, and so forth.

Further, in each box area, it is possible to register a plurality of jobs (e.g. 100, jobs at the maximum). Further, in the box mode, processing of printing jobs stored in the box can be executed. In this case, the user selects the box mode via the operating section 503, and then selects a desired one of the box areas.

Then, a desired job is selected from the selected box area, and the selected job can be printed by the printer section 507 under the desired output conditions.

If it is determined in a step S1008 that the job to be processed is a transmission job in which an image of an original is read and the read image data is transmitted to another apparatus (another external apparatus, such as another copying machine, another multifunction machine, another facsimile machine, another computer), the CPU 502 causes the image reading section 504 and a corresponding one of the external interface sections 509 to 511 to carry out the transmission job. For example, a job (image data) read from the image-reading section 504 is subjected to image processing according to the output conditions set by the user via the setup screen shown in FIG. 6C, and the processed job is transmitted to an external apparatus corresponding to the destination set by the user via the setup screen in FIG. 6C. It should be noted that although not shown, in the case of a job in the print mode, the job in the print mode output from the external apparatus is read from the hard disk 506 and subjected to the printing process according to the output conditions of the job. If the job to be processed is an undefined job other than the above jobs, the present process is immediately terminated.

After the step S1010, the step S1011, or the step S1012 has been executed, it is determined in a step S1013 whether or not processing of the job has been completed. For example, when the multifunction machine 401 is operating in the copy mode, it is determined whether or not the copying process to produce a required number of printed copies has been completed. Further, when a job selected from the box area of the user is being printed in the box mode, it is determined whether or not printing of the job to produce a required number of printed sheets has been completed. Further, in the case of the transmission mode, it is determined whether or not transmission of a job in the transmission mode stored on the hard disk 506 to all destinations selected by the user has been completed.

If the processing of the job has not yet been completed, the process returns to the step S1006, whereas if the processing has been completed, the CPU 502 determines in a step S1020 whether or not the job is to be erased. Whether a job should be erased is determined, e.g. by checking a security level (or erasing method) set to the job with reference to the management table shown in FIG. 9. For example, when the management table shown in FIG. 9 is referred to, if the setting of the job is "Normal" security level set via the UI screen shown in FIG. 7, or "Do not erase" set via the UI screen shown in FIG. 8, the CPU 502 provides control such that the job is not erased from the hard disk 506 (causes the job to be preserved on the hard disk 506 as it is). In short, none of five kinds of erasing process according to the present embodiment are executed on the job.

On the other hand, when the management table shown in FIG. 9 is referred to, if the setting of the job is any of Security levels 1 to 5, or any of erasing methods (1) to (5) set by the UI screen shown in FIG. 8, the CPU 502 determines that the job is to be erased from the hard disk 506, and the process proceeds to the following step S1021.

If it is determined that the job is to be erased, in the step S1021, the CPU 502 reads out the security level or erasing method set to the job from the management table data shown in FIG. 9 of the hard disk 506 to check the security level or erasing method. In a step S1022, the CPU 502 carries out the data erasing process on the job to be erased (series of image data), based on the security level or erasing method read out from the hard disk 506.

For example, in erasing the job set to Security level 1 or Erasing method (1), the CPU 502 provides control such that the data erasing process is carried out on the job stored on the hard disk 506 according to the data erasing method corresponding to Security level 1 or Erasing method (1). This makes it impossible to read the job from the hard disk 506.

Further, for example, in erasing the job set to Security level 2 or Erasing method (2), the CPU 502 provides control such that the data erasing process is carried out on the job stored on the hard disk 506 according to the data erasing method corresponding to Security level 2 or Erasing method (2). This makes it impossible to read the job from the hard disk 506.

Further, similarly, on a job set to Security level 3 or Erasing method (3), the data erasing process is carried out by the data erasing method corresponding to Security level 3 or Erasing method (3). On a job set to Security level 4 or Erasing method (4), the data erasing process is carried out by the data erasing method corresponding to Security level 4 or Erasing method (4). On a job set to Security level 5 or Erasing method (5), the data erasing process is carried out by the data erasing method corresponding to Security level 5 or Erasing method (5).

Thus, the CPU 502 carries out control of the hard disk 506 to make a job stored on the hard disk 506 impossible to read therefrom, by one of the methods described above.

In a step S1023, the CPU 502 determines whether or not the erasing process in the step S1022 has been completed. For example, when the job is comprised of five pages, it is determined whether or not the erasing process of all the five pages has been completed. If the erasing process has not yet been completed, the process returns to the step S1022, whereas if the erasing process has been completed, the process proceeds to a step S1014, wherein the CPU 502 determines whether or not there is any other job to be processed. In this step, the CPU 502 determines with reference to the job queue used in the step S1004, whether or not another job to be processed exists on the hard disk 506. If another job to be processed exists on the hard disk 506, the present process returns to the step S1005, whereas if no other job to be processed exists on the hard disk 506, the process is immediately terminated.

If it is determined by referring to the management table shown in FIG. 9 in the step S1020 that the job is not to be erased, the process proceeds to the step S1014, wherein the CPU 502 determines whether or not there is any other job to be processed. If there is another job to be processed, the present process returns to the step S1005, whereas if there is no other job to be processed, the process is immediately terminated.

Although in the process of the flowchart shown in FIGS. 10 and 11, the step S1002 is provided so as to input a security level or an erasing method of a job via the job security level-setting screen shown in FIG. 7 or the data erasing method-setting screen shown in FIG. 8 according to instructions by the user (to enable the user to set the security level or erasing method to a job), this is not limitative, but the controller section 501 (CPU 502) can automatically set the security level or the erasing method on a job-by-job basis according to the kind (copy, transmission, box) or attribute information (copy modes, transmission modes, reception and print modes, box modes) of a job.

FIG. 12 is a diagram showing a table in which security levels or erasing methods are set in a manner associated with attribute information (printing conditions as the output conditions in the illustrated example) of jobs to be carried out by the multifunction machine 401. This table is stored on the hard disk 506.

As shown in FIG. 12, in a manner associated with a plurality of operating modes of the digital multifunction machine, such as a normal copy mode, an applied copy mode (including a copy mode with addition of water mark information, a reduced layout mode for laying out a plurality of pages of images on the same surface of a single sheet, a numbering mode for forming copies of an original by adding page numbers thereto, a mixed original mode for printing out originals having different sizes together as a single job, and other image forming methods), a normal transmission mode, a confidential transmission mode (mode of transmitting data to a particular party at the other end), a normal reception and print mode, a confidential reception and print mode (including a mode of receiving and printing data from a particular party at the other end, a mode for requesting a user as a particular party at the other end to input a password to enable the job to be printed by instructions from an image processing apparatus at the other end, etc.), a no-password box mode (including a mode for storing a job in a box area to which no password is set, a mode for reading out a job from a box area to which no password is set and causing the outputting process, such as the printing process or the transmitting process, to be carried, etc.), and a password-protected box mode (including a mode for requesting a user to input a password set to a box area from the operating section 503 to thereby allow the job to be stored in the box area, a mode for requesting a user to input a password to a box area to which the password has been set to thereby allow the job to be read from the box area and cause the outputting process, such as the printing process or the transmitting process, to be carried, etc.), there are set in advance respective security levels: Normal (data erasure is not carried out), Security level 1 (Erasing method (1)), Security level 1 (Erasing method (1)), Security level 2 (Erasing method (2)), Security level 1 (Erasing method (1), Security level 4 (Erasing method (4)), Security level 3 (Erasing method (3)), and Security level 5 (Erasing method (5)).

It should be noted that the setting of a security level (erasing method) to each operating mode can be effected by a user via a user mode-setting screen, not shown, of the operating section 503, or automatically set by the controller section 501. Then, the controller section 501 causes the set modes and security levels (erasing methods) to be associated with each other and stored e.g. in a tabulated form shown in FIG. 12.

FIG. 13 is a diagram showing table data prepared in a memory (the hard disk 506 in the present example) based on the table data of FIG. 12 and attribute information of a job input to the hard disk (this attribute information is determined depending on the output conditions set to the job by the user), in which job files in a tabulated form are entered which are stored on the hard disk 506 of the multifunction machine 401 in association with security levels or erasing methods set based on attribute information of the jobs.

As shown in FIG. 13, for jobs 1 to N to be processed by the multifunction machine 401, job files 1 to N comprised of data of components of the jobs 1 to N, print data of the jobs 1 to N, data of attribute information of the jobs 1 to N, and security levels or erasing methods set to the jobs are stored on the hard disk 506 in association with each other. The table data are updated under the control of the controller section 501 whenever a job is input to the hard disk 506.

Next, an erasing process carried out on a job by the multifunction machine 401 will be described with reference to FIGS. 14 and 15.

FIGS. 14 and 15 form a flowchart of the erasing process carried out by the multifunction machine 401 based on automatic setting of a security level or erasing method to a job. The process shown in this flowchart is executed by the CPU 502 of the controller section 501 of the multifunction machine 401.

First, in a step S1301, the user sets an output condition of a job via the operating section 503 of the multifunction machine 503. It should be noted that when a job to be processed is input from an external apparatus, the output conditions of the job are set by the external apparatus, and therefore, in this case, the setting via the operating section 503 is not necessarily required. In the illustrated example, the job is set to one of a copy job, a box job, and a transmission job.

In a step S1303, the CPU 502 checks the output condition of the job set by the user in the step S1301 and determines what security level (erasing method) corresponds to the output condition (attribute information) with reference to the table data shown in FIG. 12. Based on the result of the determination, the security level (erasing method) associated with the job is determined.

For example, if the output condition (attribute information) set to the job by the user in the step S1301 is the applied copy mode, the controller section 501 (CPU 502) determines by referring to the table data in FIG. 12 that the security level (erasing method) of the job is Security level 1 (Erasing method (1)).

If the job input from an external apparatus has been set to the confidential reception print mode (in this case, no setting is effected in the step S1301), for example, the CPU 502 determines by referring to the table data in FIG. 12 that the security level (erasing method) of the job is Security level 4 (Erasing method 4).

If the output condition set to the job by the user in the step S1301 is the password-protected box mode, the CPU 502 determines by referring to the table data in FIG. 12 that the security level (erasing method) of the job is Security level 5 (Erasing method 5).

Then, after determination of the security level (erasing method) associated with the attribute information of the job defined by the output condition set to the job by the user through the comparison between the attribute information and the contents of the table data shown in FIG. 12, the CPU 502 registers the job, the attribute information of the job, and the security level (erasing method) determined for the job, on the hard disk 506 as management information in which they are associated with each other. This processing is carried out on a job-by-job basis whenever each job is input, whereby the management information is properly updated. This makes it possible to form the table data as shown in FIG. 13.

It should be noted that in the case of a job in the print mode, the step S1301 is skipped, and in the step S1303, based on the output conditions set by the printer driver of an external apparatus, and the table data shown in FIG. 12, the security level or erasing method to be set to the job in the print mode which has been input from the external apparatus is determined, and the determination is caused to be reflected in the management table stored on the hard disk 506.

In a step S1304, the CPU 502 determines whether or not there is a job to be processed by the multifunction machine 401, e.g. by referring to data of a job queue. If the hard disk 506 does not store any job to be processed, the present process is immediately terminated, whereas if the hard disk 506 stores a job to be processed, in the following step S1305, the job to be processed is read out from the hard disk 506. Hereafter, the following process is carried out depending on the kind of job to be processed (copy job, box job, or transmission job, print job) and attribute information (normal copy mode, applied copy mode, normal transmission mode, confidential transmission mode, normal reception and print mode, confidential reception and print mode, no-password box mode, password-protected box mode, etc) based on the output conditions set by the user.

If it is determined in a step S1306 that the job to be processed is a copy job in which an image of an original is read and a copy of the read image is formed on paper, the CPU 502 causes the image reading section 504 and the printer section 507 to carry out the copy job in a step S1310. It should be noted in this case, the copying process is carried out according to the operating mode (normal copy mode or applied copy mode) set by the user.

If it is determined in a step S1307 that the job to be processed is a job in the box mode, such as storing of data of an image in the image memory section 505, the process proceeds to a step S1311 wherein the CPU 502 registers the job in a box, for example. Also, for example, the CPU 502 reads out a job from the box and carries out the printing process or the transmitting process. It should be noted in this case, the box process is carried out according to the operating mode (password-protected box mode/no-password box mode) set by the user. For example, a job is registered in a box area with a password, or when a job is to be printed by reading the job, a user is requested to input a password, and through inputting of a valid password, the user is permitted to use box area.

If it is determined in step S1308 that the job to be processed is a job in the transmission mode in which an image of an original is read and the read image data is transmitted to another apparatus, the CPU 502 causes the image reading section 504 and a corresponding one of the external interface sections 509 to 511 to carry out the transmission job. It should be noted that in this case, the transmission process is executed according to the operating mode (normal transmission mode/confidential transmission mode, etc.) set by the user. If the job to be processed is an undefined job other than the above jobs, the present process is terminated (due to omission of processing thereon in the illustrated example).

After the step S1310, the step S1311, or the step S1312 has been executed, it is determined in a step S1313 whether or not processing of the job has been completed. For example, assuming that the job to be processed is one comprised of ten pages, it is determined whether or not processing of the ten pages has been completed. If the processing of the job has not yet been completed, the process returns to the step S1306.

If the processing has been completed, the CPU 502 determines in a step S1320 by referring to the security level (erasing method) set to the job being processed and stored in the table data in FIG. 13 whether or not the job is to be erased. For example, when the job being processed is one registered as the job file 2 in the table data shown in FIG. 13, the job is not to be erased since the security level thereof is "Normal". On the other hand, if it is registered as any of job files 1, 3, 4, N−3, N−2, N−1, and N, it is determined that the job is to be erased. If it is determined that the job is to be erased, in a step S1321, the CPU 502 reads out the attribute information and the security level or erasing method of the job from the table data shown in FIG. 13 which are formed and stored on the hard disk 506.

In a step S1322, the CPU 502 determines by referring to the table data shown in FIG. 12 which are formed and stored in advance on the hard disk 506 whether or not correspondence between the attribute information and the security level or erasing method read out from the hard disk 506 is correct.

If the correspondence between the attribute information and the security level or erasing method read out is correct, in a step S1323, the CPU 502 carries out the erasing process of the job to be erased, based on the security level or erasing method read out from the hard disk 506.

Assuming, for example, that the job being processed is one registered as the job file 4 in the table data shown in FIG. 13, an attribute (output condition) of the job is the applied copy mode, so that the data of the job 4 is erased by the erasing method corresponding to Security level 1 (Erasing method (1)). Further, assuming, for example, that the job being processed is one registered as the job file N in the table data shown in FIG. 13, the attributes (output conditions) of the job include the password-protected box mode, so that the data of the job 5 is erased by the erasing method corresponding to Security level 5 (Erasing method (5)).

In the following step S1324, it is determined whether or not the erasing process in the step S1323 has been completed. For example, if the job is comprised of ten pages, it is determined whether or not the data erasing process on all data of the ten pages has been completed. If the erasing process has not been completed, the process returns to the step S1323.

If it is determined in the step S1324 that the erasing process has been completed or if it is determined in the step S1322 that the correspondence between the attribute information and the security level or erasing method read out from the hard disk 506 is not correct, the process returns to the following step S1314, wherein the CPU 502 determines by checking a job queue whether or not the hard disk 506 stores any other job to be processed. If the hard disk 506 stores another job to be processed, the present process returns to the step S1305, whereas if the hard disk 506 stores no other job to be processed, the process is immediately terminated.

If it is determined in the step S1320 that the job is not to be erased, the process proceeds to the step S1014, wherein the CPU 502 determines whether or not there is any other job to be processed. If there is another job to be processed, the process returns to the step S1305, whereas if there is no other job to be processed, the present process is immediately terminated.

As described heretofore, according to the present embodiment, the multifunction machine 401 erases data stored on the hard disk 506 by a data erasing method based on the security level or erasing method set (manually or automatically) to a job stored in storage means. This makes it possible to maintain high data security, and hence the present embodiment provides a convenient and highly secure printer.

Particularly, in the present embodiment, the data erasing method can be selectively set to a desired one of a plurality of (five in the present embodiment) available data erasing methods for jobs to be stored in storage means (hard disk 506 of the present machine in the case of the present embodiment) on a job-by-job basis in a discriminating fashion. At the same time, the designation of the data erasing method for each job can be set through manual selection by the user, or through automatic selection by the controller section according to attribute information of a job.

This provides a solution to the problems of the prior art. Then, for example, when job data of a plurality of users remain on the storage medium, it is possible to prevent the problem of erasing data of users who do not wish to have their data erased without his permission, thereby improving usability.

Further, it is possible to prevent much time from being taken for data erasure when the storage medium stores a plurality of jobs, due to control of the data erasure for erasing all of the jobs.

Further, it is possible to flexibly meet various needs of users, such as the demand of high-speed in the data erasure, the demand of security or reliability in the data erasure, thereby meeting various needs of users, such as the demand of high-speed in the data erasure, the demand of high data security, and so forth and realizing compatibility between the high data erasing speed and the high data security and reliability, in a manner meeting the needs of users.

Although in the first to fifth embodiments, the image processing apparatus (including an image forming apparatus, a printing apparatus, and a data processing apparatus) for carrying out the data erasure control according to the present invention is applied to an apparatus such as a printer and a multifunction machine by way of example, this is not limitative, but the present invention can also be applied to single-function image processing apparatuses (including image forming apparatuses and printing apparatuses), such as a copying machine, a facsimile machine, and a printer, and an image processing apparatus not having a printing function but having only a scanner function. The data processing method (data erasing method) can be applied to a data processing system including any of the above-mentioned image processing apparatuses, image forming apparatuses, printing apparatuses, and data processing apparatuses.

Further, although in the second embodiment, the number of security print modes that are employed is five, this is not limitative, but there may be employed an arbitrary number of security print modes insofar as they do not depart from the sprit and scope of the present invention.

Further, although in the fifth embodiment, the number of security levels that are employed is five, this is not limitative, but there may be employed arbitrary number of security levels insofar as they do not depart from the sprit and scope of the present invention.

For example, the present invention is applicable to various apparatuses which are capable of executing at least two of data erasing methods (data erasing modes) out of a plurality (five in the fifth embodiment) data erasing methods (data erasing modes) associated with a plurality of security levels (erasing methods).

Further, although in the fifth embodiment, the correspondence between job files and security levels (or erasing methods) is set as shown, by way of example, in FIGS. 9 and 13, this is not limitative, but the correspondence may be changed insofar as it does not depart from the sprit and scope of the present invention.

For example, it is not necessarily required to arrange jobs in order as in the case of the table data shown in FIG. 9 or FIG. 13, but the table data may be prepared in a random fashion. Further, the data may be managed by any other suitable method without using the tabulated form. That is, insofar as the CPU 502 is capable of properly associating jobs and security levels (erasing methods), and management, reference, or calling of the association, the present invention is applicable.

Although in the fifth embodiment, when a job is input to the storage means (which is the hard disk 506 in the illustrated example, but may be a memory of a host computer or a server, or a memory removably installed on the present machine), a security level (or erasing method) is set to the job stored in the storage means manually by the user (as described with reference to FIGS. 7 to 10) or automatically by the CPU 502 according to the attribute of the job (as described with reference to FIGS. 11 to 15), and in a stage of erasing the job, the controller section 501 provides control such that data erasing process is carried out on the job by the erasing method based on the setting of the security level (or erasing method), this is not limitative, but the data erasure may be carried out in the following manner:

For example, at a stage immediately before the erasing process is carried out on the job (e.g. between the step S1021 and the step S1022 in the control example shown in FIG. 11, and e.g. between the step S1322 and S1323 in the control example shown in FIG. 15), a new step may be inserted to allow the controller section 501 to provide control such that the user is notified of a message saying that the job is to be erased and guiding the user to the security level or erasing method of the job, via the user interface, such as the operating section 503, and after confirmation of the user's intention, the data erasure is carried out on the job according to the desired erasing method.

In this case, the controller section 501 causes an operation screen to be displayed on the user interface, such as the operating section 503, the operation screen including a display portion displaying guidance information, such a message saying "Data of this job is about to be erased at Security level (Erasing method) 2, (this value is one of Security levels 1, to 5, set by the user, which is confirmed in the step S1021, or S1321). Is it OK to execute the data erasure? If it is OK, please push OK button. To cancel the erasing process, please push Cancel button. To change the erasing method, please push [Erasing method change] button."

Then, in the state of the operation screen being displayed on the operation screen, the CPU 502 of the controller section 501 provides control such that in response to the pushing of the OK button displayed on the operation screen having the guidance display portion by the user, the process proceeds to the step S1022 in the illustrated example of FIG. 13 (to the step S1323 in the illustrated example of FIG. 15), or in response to the pushing of the cancel button, not shown, by the user the process directly proceeds to the step S1004 (to the step S1304 in the illustrated example of FIG. 15) without executing the erasing process.

On the other hand, in response to the pushing of the [Erasing method change] button, not shown, displayed on the operation screen having the guidance display portion by the user, the CPU 502 controls the operating section 503 to display the setup screen of FIG. 7 or that of FIG. 8 again. This allows the user to change the setting of the erasing method set to the job. Then, e.g. when the user has changed the setting of the data erasing method and pushed the confirmation button (OK button), in response to this, the CPU 502 provides control such that the data of the job is erased from the hard disk 506. Through this control, the features of the present invention becomes more effective, and usability is further improved.

Further, although in the fifth embodiment, the security levels (erasing methods) can be set on a job-by-job basis, this is not limitative, but the image processing apparatus according to the invention can be configured as follows:

For example, in the box mode, a plurality of virtual user areas (box areas) are allocated in the predetermined area on the hard disk 506 (100, box areas are provided on the hard disk 506 in the present example), and a plurality of jobs can be stored in each box area.

Further, the box areas on the hard disk 506 can be each configured such that a security level (or erasing method) can be set thereto by the user (on a box area-by-box area basis). In this case, when a registration process is carried out on a box area (e.g. when a user selects, via the screen shown in FIG. 6D, one of available box areas and registers a password and a user name in association with the selected box area to use the same), the controller section 501 causes a setup screen similar to that of FIG. 7 or FIG. 8 on the operating section 503.

Then, after the registration of the selected box area is completed, table data as shown in FIG. 9 is formed in a memory for enabling confirmation of the security level (erasing method) set to each box area, on a box area-by-box area basis. Then, in the box mode, the user selects a desired one of the box areas, and selects a desired job from the selected box area, and subsequently, when the desired job is about to be erased, the controller section 501 refers to the management table storing the setting of each box area to check the security level (or erasing method) set to the box area, and causes the data of the job to be erased from the hard disk 506 by the data erasing method associated with the security level (or erasing method).

Thus, the control by controller section 501 may be configured such that the security level (or erasing method) can be set not only for each job on a job-by-job basis but also for each box area on the hard disk 506 on a box area-by-box area basis. The present invention is applicable to both of the cases. This further enhances the advantageous effects of the invention, and further provides services flexible to users.

It is to be understood that the object of the present invention may also be accomplished by supplying a computer (or CPU or MPU) with a program code of software (flowchart of which is shown in FIGS. 2, 10, 11, 14, and 15) which realizes the functions of any of the embodiments described above, and causing the computer (or CPU or MPU) to read and execute the program code.

In this case, the program code may be supplied directly from a storage medium storing the same, or by download thereof from another computer or database, not shown, connected to the Internet, a commercial network, or a local area network.

The program code may be in any of the forms of an object code, a program code executed by an interpreter, script data supplied to an OS (Operating System), etc.

When the program code is supplied in a state stored in the storage medium, the program code itself read from the storage medium, realizes the functions of the above described embodiments, and hence the storage medium in which the program code is stored constitutes the present invention.

Examples of the storage medium for supplying the program code include a ROM, a RAM, a NV-RAM, a floppy (registered trademark) disk, a hard disk, an optical disk (registered trademark), a magnetic-optical disk, a CD-ROM, an MO, a CD-R, a CD-RW, a DVD-ROM, a DVD-RAM, a DVD-RW, a DVD+RW, a magnetic tape, and a nonvolatile memory card.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

What is claimed is:

1. A data processing apparatus comprising:
  a registering unit configured to register a first processing mode in association with a first erasing method and to register a second processing mode in association with a second erasing method;
  a selecting unit configured to select one of the first processing mode and the second processing mode, the first processing mode comprising one of (i) a copy mode and (ii) a transmission mode, and the second processing mode comprising one of the copy mode and the transmission mode and being different from the first processing mode;
  a processing unit configured to process the image data in the one of the first processing mode and the second processing mode selected by the selecting unit;
  a specifying unit configured to automatically specify one of the first erasing method and the second erasing method, which is associated with the one of the first processing mode and the second processing mode selected by the selecting unit; and
  an erasing unit configured to erase the image data processed by the processing unit by using the one of the first erasing method and the second erasing method specified by the specifying unit,
  wherein each of the first erasing method and the second erasing method comprises a method for overwriting erasure data over data blocks of the image data stored in a storage unit, and
  wherein the second erasing method has a greater reliability than the first erasing method.

2. A data processing apparatus according to claim 1, wherein the first erasing method comprises a method for overwriting predetermined data over the data blocks of the image data stored in the storage unit, and the second erasing method comprises a method for overwriting arbitrary data over the data blocks of the image data stored in the storage unit.

3. A data processing apparatus according to claim 1, wherein the first erasing method comprises a method for overwriting erasure data over part of the data blocks of the image data stored in the storage unit, and the second erasing method comprises a method for overwriting erasure data over all of the data blocks of the image data stored in the storage unit.

4. A data processing apparatus according to claim 3, wherein the part of the data blocks includes a start data block of the image data stored in the storage unit.

5. A data processing apparatus according to claim 1, wherein the erasing unit erases the image data after the processing unit has completed processing of the image data.

6. A data processing apparatus according to claim 1, wherein said registering unit registers the first erasing method in association with the first processing mode and registers the second erasing method in association with the second processing mode, in accordance with an instruction from a user.

7. A data processing method comprising:
  registering a first erasing method in association with a first processing mode and registering a second erasing method in association with a second processing mode;
  selecting one of the first processing mode and the second processing mode, the first processing mode comprising one of (i) a copy mode and (ii) a transmission mode, and the second processing mode comprising one of the copy mode and the transmission mode and being different from the first processing mode;
  processing the image data in the one of the first processing mode and the second processing mode selected in the selecting step;
  automatically specifying one of the first erasing method and the second erasing method, which is associated with the one of the first processing mode and the second processing mode selected in the selecting step; and
  erasing the image data processed in the processing step by using the one of the first erasing method and the second erasing method specified in the specifying step,
  wherein each of the first erasing method and the second erasing method comprises a method for overwriting erasure data over data blocks of the image data stored in a storage unit, and
  wherein the second erasing method has a greater reliability than the first erasing method.

8. A non-transitory computer-readable storage medium storing a computer-executable program for executing a data processing method, the method comprising:
  registering a first erasing method in association with a first processing mode and registering a second erasing method in association with a second processing mode;

selecting one of the first processing mode and the second processing mode, the first processing mode comprising one of (i) a copy mode and (ii) a transmission mode, and the second processing mode comprising one of the copy mode and the transmission mode and being different from the first processing mode;

processing the image data in the one of the first processing mode and the second processing mode selected in the selecting step;

automatically specifying one of the first erasing method and the second erasing method, which is associated with the one of the first processing mode and the second processing mode selected in the selecting step; and erasing the image data processed in the processing step by using the one of the first erasing method and the second erasing method specified in the specifying step, wherein each of the first erasing method and the second erasing method comprises a method for overwriting erasure data over data blocks of the image data stored in a storage unit, and wherein the second erasing method has a greater reliability than the first erasing method.

* * * * *